United States Patent
Long, IV et al.

(10) Patent No.: US 12,403,379 B1
(45) Date of Patent: Sep. 2, 2025

(54) ELECTRONIC CONVERSION, CONSOLIDATION AND COORDINATION OF TOUR PLAYER DOCUMENTS, SCORING, RULING AND NOTIFICATION FUNCTIONS

(71) Applicants: Arthur Long, IV, Knoxville, TN (US); Arthur Long, III, Knoxville, TN (US)

(72) Inventors: Arthur Long, IV, Knoxville, TN (US); Arthur Long, III, Knoxville, TN (US)

( * ) Notice: Subject to any disclaimer, the term of this patent is extended or adjusted under 35 U.S.C. 154(b) by 0 days.

(21) Appl. No.: 18/590,408

(22) Filed: Feb. 28, 2024

Related U.S. Application Data

(63) Continuation of application No. 16/234,851, filed on Dec. 28, 2018, now abandoned.

(60) Provisional application No. 62/642,352, filed on Mar. 13, 2018.

(51) Int. Cl.
| | |
|---|---|
| *A63B 71/06* | (2006.01) |
| *G06F 3/0482* | (2013.01) |
| *G06F 3/0488* | (2022.01) |
| *A63B 102/32* | (2015.01) |

(52) U.S. Cl.
CPC ........ *A63B 71/0669* (2013.01); *G06F 3/0482* (2013.01); *G06F 3/0488* (2013.01); *A63B 2071/0691* (2013.01); *A63B 2102/32* (2015.10); *A63B 2225/50* (2013.01)

(58) Field of Classification Search
None
See application file for complete search history.

(56) References Cited

U.S. PATENT DOCUMENTS

| | | | |
|---|---|---|---|
| 4,910,677 A | 3/1990 | Remedio et al. | |
| 5,245,537 A | 9/1993 | Barber | |
| 6,030,109 A | 2/2000 | Lobsenz | |
| 6,571,143 B1 | 5/2003 | Mallamo | |
| 6,775,580 B2 | 8/2004 | Jira et al. | |
| 7,657,920 B2 | 2/2010 | Arseneau et al. | |
| 7,689,229 B2 | 3/2010 | Geary et al. | |
| 8,051,452 B2 | 11/2011 | Arseneau et al. | |
| 8,083,617 B2 | 12/2011 | Greenquist et al. | |
| 8,175,582 B2 | 5/2012 | Benco et al. | |
| 9,806,832 B2 * | 10/2017 | Long, III | A63B 71/0622 |
| 9,811,596 B2 | 11/2017 | Kerr | |

(Continued)

FOREIGN PATENT DOCUMENTS

WO 2005050521 6/2005

*Primary Examiner* — Howard Cortes
(74) *Attorney, Agent, or Firm* — Robinson IP Law, PLLC

(57) ABSTRACT

An electronic system of consolidated golfer information documents includes: a portable player handheld device including a display, a process, and a computer readable storage medium; computer operable instructions implemented on the portable handheld player device, the computer operable instructions configured to consolidate a plurality of the player competition documents selected from the group consisting of a scorecard, yardage book, pin sheet, greens maps, local rules, conditions of competition, and notices to players; and a user interface operable on the portable handheld device, the user interface configured to display data of one or more of the player competition documents in response to input received on the portable player handheld device from a user. The plurality of the player competition documents is consolidated on the portable player handheld device and are accessible by the user during competition in a golf event.

20 Claims, 27 Drawing Sheets

(56) References Cited

U.S. PATENT DOCUMENTS

| | | |
|---|---|---|
| 9,989,337 B2 * | 6/2018 | Macher .................... F41J 3/02 |
| 10,270,552 B1 | 4/2019 | Long, III |
| 2002/0082122 A1 | 6/2002 | Pippin |
| 2002/0151994 A1 | 10/2002 | Sisco |
| 2003/0090474 A1 | 5/2003 | Schaefer |
| 2003/0144754 A1 | 7/2003 | Butts |
| 2003/0149496 A1 * | 8/2003 | Johnson ............ A63B 24/0021 700/91 |
| 2003/0189589 A1 | 10/2003 | LeBlanc et al. |
| 2003/0191547 A1 | 10/2003 | Morse |
| 2004/0119763 A1 | 6/2004 | Mizobuchi |
| 2004/0122538 A1 | 6/2004 | Gowan |
| 2004/0147329 A1 | 7/2004 | Meadows |
| 2004/0162125 A1 | 8/2004 | Tarlie |
| 2005/0096761 A1 | 5/2005 | Hanover, Jr. et al. |
| 2005/0227791 A1 | 10/2005 | McCreary |
| 2007/0019069 A1 | 1/2007 | Arseneau et al. |
| 2008/0092202 A1 | 4/2008 | Greenquist et al. |
| 2008/0167737 A1 | 7/2008 | Schmidt |
| 2010/0261533 A1 | 10/2010 | Kryger |
| 2010/0311522 A1 | 12/2010 | Balardeta |
| 2011/0076657 A1 | 3/2011 | Forest |
| 2011/0184538 A1 | 7/2011 | Baker et al. |
| 2011/0202397 A1 | 8/2011 | Lam et al. |
| 2011/0213474 A1 | 9/2011 | Jung |
| 2012/0004748 A1 | 1/2012 | Taffera |
| 2012/0053708 A1 | 3/2012 | Bonito |
| 2012/0094591 A1 | 4/2012 | Ortiz et al. |
| 2012/0265327 A1 | 10/2012 | Buckley et al. |
| 2013/0029790 A1 | 1/2013 | Clark |
| 2013/0218311 A1 | 8/2013 | Buckley et al. |
| 2013/0274905 A1 | 10/2013 | Berghane et al. |
| 2013/0305354 A1 | 11/2013 | King |
| 2013/0331969 A1 | 12/2013 | Piercy |
| 2014/0058547 A1 | 2/2014 | Clark |
| 2014/0114451 A1 | 4/2014 | Kerr |
| 2014/0123318 A1 | 5/2014 | Belvin |
| 2014/0195024 A1 | 7/2014 | Olsson et al. |
| 2014/0277627 A1 | 9/2014 | Bastawros |
| 2014/0315660 A1 | 10/2014 | Edmonson |
| 2014/0324616 A1 | 10/2014 | Proietti |
| 2015/0196822 A1 | 7/2015 | Voutilainen |
| 2016/0063066 A1 | 3/2016 | Kamel |
| 2016/0328478 A1 | 11/2016 | Jindra |
| 2016/0330084 A1 | 11/2016 | Hunter |
| 2016/0346691 A1 | 12/2016 | McClure et al. |
| 2018/0040038 A1 | 2/2018 | Vanslette |
| 2018/0316659 A1 | 11/2018 | York |
| 2020/0112825 A1 | 4/2020 | Phillips |
| 2020/0159838 A1 | 5/2020 | Kikin-Gil |

* cited by examiner

HOME

Electronic Conversion, Consolidation and Coordination of Tour Player Documents, Scoring, Ruling and Notification Functions

INDIVIDUAL HOLE

Electronic Conversion, Consolidation and Coordination of Tour Player Documents, Scoring, Ruling and Notification Functions

INDIVIDUAL HOLE

Electronic Conversion, Consolidation and Coordination of Tour Player Documents, Scoring, Ruling and Notification Functions Electronic Conversion, Consolidation and Coordination of Tour Player Documents, Scoring, Ruling and Notification Functions

YARDAGE BOOK

Electronic Conversion, Consolidation and Coordination of Tour Player Documents, Scoring, Ruling and Notification Functions Electronic Conversion, Consolidation and Coordination of Tour Player Documents, Scoring, Ruling and Notification Functions

GREENS MAP

Electronic Conversion, Consolidation and Coordination of Tour Player Documents, Scoring, Ruling and Notification Functions Electronic Conversion, Consolidation and Coordination of Tour Player Documents, Scoring, Ruling and Notification Functions

INFO CENTER

Electronic Conversion, Consolidation and Coordination of Tour Player Documents, Scoring, Ruling and Notification Functions

SCORECARD

Electronic Conversion, Consolidation and Coordination of Tour Player Documents, Scoring, Ruling and Notification Functions

LEADERS

Electronic Conversion, Consolidation and Coordination of Tour Player Documents, Scoring, Ruling and Notification Functions

LOCAL RULES

Electronic Conversion, Consolidation and Coordination of Tour Player Documents, Scoring, Ruling and Notification Functions

NOTICES

Electronic Conversion, Consolidation and Coordination of Tour Player Documents, Scoring, Ruling and Notification Functions

CONDITIONS OF COMPETITION

Electronic Conversion, Consolidation and Coordination of Tour Player Documents, Scoring, Ruling and Notification Functions

SCORES

RULINGS AREA

RULINGS SIDE

Electronic Conversion, Consolidation and Coordination of Tour Player Documents, Scoring, Ruling and Notification Functions

RULING REQUEST

Electronic Conversion, Consolidation and Coordination of Tour Player Documents, Scoring, Ruling and Notification Functions

RULING CONFIRMATION

Electronic Conversion, Consolidation and Coordination of Tour Player Documents, Scoring, Ruling and Notification Functions Electronic Conversion, Consolidation and Coordination of Tour Player Documents, Scoring, Ruling and Notification Functions

CONFLICT NOTICE

Electronic Conversion, Consolidation and Coordination of Tour Player Documents, Scoring, Ruling and Notification Functions

SCORECARD CONFLICT

Electronic Conversion, Consolidation
and Coordination of Tour Player
Documents, Scoring, Ruling and
Notification Functions Electronic Conversion, Consolidation and Coordination of Tour Player Documents, Scoring, Ruling and Notification Functions

ELECTRONIC CONVERSION, CONSOLIDATION AND COORDINATION OF TOUR PLAYER DOCUMENTS, SCORING, RULING AND NOTIFICATION FUNCTIONS

CROSS-REFERENCE TO RELATED APPLICATION

This application is a continuation of U.S. application Ser. No. 16/234,851, filed Dec. 28, 2018, which claims priority to U.S. Provisional Patent Application Ser. No. 62/642,352 for "Electronic Conversion, Consolidation and Coordination of Tour Player Documents, Scoring, Ruling and Notification Functions" filed on Mar. 13, 2018, the contents of which are incorporated herein by reference in its entirety.

FIELD

Embodiments of the present disclosure relate generally to the electronic conversion, consolidation and coordination of the documents, information and the functions that a professional golf tour player or amateur requires during a round of golf to be accessed on a handheld device. Embodiments of the present disclosure also provide for: 1) the electronic recording and real time transmission of the only official score of the player(s) and his competitor(s) for which he is marking, this function not presently available in any form; 2) the placement of electronic notes on the above referenced documents by the player or his caddie; 3) the recall and filtering of same notes; 4) the summoning of tournament officials for rulings; and 5) the electronic signing and submission of scorecards.

BACKGROUND

Professional tour players require many documents during play. Those documents are typically provided in paper formats which are voluminous, difficult to cross reference, and difficult to handle, particularly in adverse weather conditions. Those documents include but are not limited to the official scorecard, a yardage book, a pin sheet, a greens map book, the local rules, the conditions of competition, and miscellaneous notices to players. Players also have the need to make notes on the many documents for future reference. Currently, these documents are kept by the players, generally in a leather folder in the back pocket of their trousers. Depending upon their location on the golf course and the conditions, any one of the documents may be required for viewing, thus creating a handling issue. And as the documents are all in paper format, adverse weather such as rain and wind can create extreme difficulties in manipulating those documents and in making notes on those documents. Furthermore, making notes on those documents is difficult as a caddie is attempting to make notes while walking or standing, on documents with limited space, and in all weather conditions.

Additionally, players may require contacting tournament officials throughout the round, generally for a rules decision. The present system for contacting same officials is generally dependent upon third parties, whether tournament volunteers or broadcast representatives, and can create great delays. The present general inventive concept presented herein provides for that contact to be immediate and without a third-party by using the handheld device.

Currently there is no efficient methodology for the tournament committee to communicate with all of the players to provide notices during a round of golf should conditions, such as weather, require. Embodiments of the present disclosure provide for such notifications.

Wind is an important factor in playing golf and the players are always analyzing the direction and force of the wind. While not currently allowed by the rules of golf, embodiments of the present disclosure allow for the players to receive information about the wind speed and direction at a specific or general site on the golf course. This provision is included in anticipation that the rules may be revised for allowing the transmission of same information to the players.

Finally, embodiments of the present disclosure provide for the electronic recording and real time reporting of official scores for use in broadcast and gallery notification. Current methods rely upon observers to record and transmit the score, but the scores reported by the observers are not official as only that score recorded by a player is official due to his knowledge of circumstances and as in accordance with the rules of golf. The proposed concept additionally would eliminate the need for those observers, who records the strokes of each player, and thus the scores, for transmission to broadcasters and galleries. Additionally, the rules of golf require that the official score for a player be kept by his "marker", a playing partner, and confirmed by the player at the end of the round. The present disclosure would eliminate any errors in scoring that are created by differences between the scores recorded by the player and his marker.

Currently the rules of golf require that the committee of the event provide a scorecard and certain official documents to the players. Accordingly, all of the provisions of the present general concept are converted to an electronic document and hosted on one small, weatherproof, commercially available handheld unit provided by the event committee or the player.

In light of the above, there exists a need for a system and method to convert, coordinate and consolidate documents, required in the participation of a golf event, to electronic format, to simplify the use of those documents for the player, to make notes on those electronic documents, to address the recording and distribution of the official score of a player, to eliminate scoring errors by the player and his marker, to eliminate the requirement of a tournament volunteer, to provide certain information to the players when permitted by the rules, to provide real time notices to the players, and to provide for a more immediate and efficient method for obtaining official rulings.

SUMMARY

Embodiments of the present general inventive concept provide systems and methods 1) to consolidate and coordinate documents, which have been converted to electronic documents, on an electronic handheld device for the use by tour golfers, 2) to make notes on those electronic documents by stylus or voice, 3) to report and transmit the only audited official score of that player, 4) to allow the electronic signature and filing of same official score, 5) to transmit certain information, including but not limited to a tournament leader board, notices or wind speed and direction, to the players when allowed, and 6) to provide for an efficient method or requesting rulings.

Additional features and embodiments of the present general inventive concept will be set forth in part in the description which follows and, in part, will be obvious from the description, or may be learned by practice of the present general inventive concept.

In a first aspect, an electronic system of consolidated golfer information documents includes: a portable player handheld device including a display, a process, and a computer readable storage medium; computer operable instructions implemented on the portable handheld player device, the computer operable instructions configured to consolidate a plurality of the player competition documents selected from the group consisting of a scorecard, yardage book, pin sheet, greens maps, local rules, conditions of competition, and notices to players; a user interface operable on the portable handheld device, the user interface configured to display data of one or more of the player competition documents in response to input received on the portable player handheld device from a user. The plurality of the player competition documents is consolidated on the portable player handheld device and are accessible by the user during competition in a golf event.

In one embodiment, the user interface receives input from the user through a touch interface on the display of the portable player handheld device to display details of the one or more of the player competition documents displayed on the portable player handheld device.

In another embodiment, the user interface receives user input associated with the one or more player competition documents displayed on the portable player handheld device, wherein the user input comprises player notes.

In yet another embodiment, the player notes are associated with the one or more player competition documents displayed on the portable player handheld device.

In one embodiment, the user interface is configured to receive user input comprising scoring information of a player for which the user is acting as a marker. In another embodiment, the user interface is further configured to receive user input comprising scoring information of the player. In yet another embodiment, the scores received from the user are transmitted to tournament officials from the portable player handheld device. In one embodiment, scores received from the user are audited by comparing scores received from the portable player handheld device with scores received from the player for which the user is acting as the marker.

In another embodiment, a request to summon a tournament official for a rules decision may be inputted on the portable player handheld device and transmitted to tournament officials. In yet another embodiment, the request to summon the tournament official includes the location of the portable player handheld device.

In one embodiment, the electronic system of consolidated golfer information includes a primary portable handheld player device and a secondary portable handheld player device. The primary portable handheld player device is operated by the player and the secondary portable handheld player device is operated by a caddie of the player. In another embodiment, input is received from both the primary portable handheld player device and the secondary portable handheld player device.

In one embodiment, the user interface is configured to receive player notes comprising environmental information. In another embodiment, player notes are stamped with local environmental data selected from the group consisting of temperature, wind speed, and time of day.

In yet another embodiment, the user interface is configured to display weather notices transmitted from one of a tournament sponsor and tournament official.

In one embodiment, the user interface is configured to receive a signature of the player and a signature of a scorekeeper upon conclusion of a round of golf.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 3 illustrates a control screen for a specific hole on the golf course on a portable handheld device from which all documents are obtained and all functions are initiated according to one embodiment of the present disclosure;

DETAILED DESCRIPTION

Figure 1:
FIG. 1 illustrates an interface with event information on a display of a portable handheld device according to one embodiment of the present disclosure.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Reference will now be made to example embodiments of the present general inventive concept, examples of which are illustrated in the accompanying drawings and illustrations. The example embodiments are described herein in order to explain the present general inventive concept by referring to the figures.

Reference will now be made to documents of the present disclosure which documents are official documents of a golf tournament, which documents include but are not limited to an official scorecard, local rules, conditions of competition, notice to players, yardage book, pin sheet, greens map book, etc. These documents are converted to electronic format for use with embodiments of the present disclosure, such electronic formats including but not limited to the following file types: PDF, JPEG, PNG, JIFF, TIFF, GIF, BMP, PPM, PGM, PBM, PNM, WebP, HDR, HEIF, BAT, BPG, CGM, etc. These documents are then organized, combined, manipulated, and sorted so that they may be retrieved in a simple and logical manner from a portable handheld device, as described in greater detail below.

Screens and associated navigation of those screens represented in FIG. 1 through FIG. 24 herein may be preloaded onto a storage of the portable handheld device for access without outside communications or may be accessed by the handheld device through an application hosted on an outside data server via Wi-Fi or cellular connections or any future available connection which serves the same purpose as Wi-Fi and cellular.

Navigation and processing of information on the screens represented in FIGS. 1-24 of the present general disclosure may be achieved through a native application preloaded or installed onto the portable handheld device or by accessing an application hosted on a remote data server via Wi-Fi or cellular service or any future available connection which serves the same purposes as Wi-Fi and cellular, such as via a web browser of the portable handheld device.

Embodiments of the present disclosure can be implemented in connection with a commercially available portable handheld device to provide electronic documents to a golf tournament player. Scores of the player and his playing partner for which he is marking, and the request for a ruling from a tournament official are transmitted from the portable handheld device to a host server, which server is accessible by tournament officials and broadcast personnel via a Wi-Fi or MESH connection or a cellular connection or some future available connection which serves the same purpose as Wi-Fi and cellular. When information is to be transmitted by the player to the event organizers, such as a score on a specific hole, but Wi-Fi or cellular service is unavailable, the information is stored locally on the portable handheld device until that time that a connection is reestablished, at which time the information is transmitted automatically. The portable handheld device may or may not be water resistant or waterproof. The portable handheld device may be configured so as to prevent telephone functions, third party texting, playing of music or videos, internet access other that for the present general inventive concept, or any other function not allowed by the tournament committee.

It is noted that the following detailed description may recite various terms such as horizontal, vertical, top, bottom, upward, downward, left, right, zoom in, zoom out, finger pinch, scroll up, scroll down, select or touch a/the button, page back, etc., when referring to the exemplary figures, but the present general inventive concept is not limited to any such terms or physical orientations. Such terms are used for convenience of description only, and could be reversed, modified, or interchanged without departing from the broader scope and spirit of the present disclosure.\d 1

Embodiments of the present disclosure include a button labeled "BACK" is shown on a screen of the portable handheld device. Touching the same button will recall a previous screen from which the current screen was summoned. This methodology is used throughout the present disclosure and will not be addressed on every screen or figure.

Referring to the example embodiments illustrated herein, a number of different methods of operation may be implemented. The drawings provided as part of this patent application generally depict an interactive display apparatus and method operating within a portable handheld device which can be carried by a player or caddy or both of a golf tournament to access tournament documents, access real-time information from the tournament officials, record notes on the tournament documents, transmit official scores, receive information from the tournament officials and request for rulings. The screens represented by the figures herein presented may be accessed from an application preloaded on the portable handheld device or accessed from an outside data server via Wi-Fi or cellular connections or some future available connection which serves the same purpose as Wi-Fi and cellular. The portable device includes commercially available GPS capabilities to provide location information to the user. In some embodiments, the portable device can communicate with a GPS communication unit, such as but not limited to GPS satellites, to acquire GPS data such as latitude, longitude of the portable unit. Other methods of communicating with GPS devices may be chosen with sound engineering judgment to provide real time location information to the portable unit. For example, the portable device can communicate with a variety of known or later developed GPS communication devices, such as cell phone towers, repeater stations, or other types of communication systems chosen with sound engineering judgment to provide location information to the portable device. In some embodiments, a GPS survey or map of the course can be made prior to the tournament to collect and record relevant geographical and/or topographical data with GPS coordinates pertaining to a particular golf course for input to the portable devices. This mapping data can be used to accurately portray hole representations and ball locations, and to generate a coverage map of the golf course, enabling a player to know his location relative to positions shown in a yardage book, based on GPS information.\d 1

Embodiments of the present disclosure may include a player module, a score tent module, and an archive module. These modules communicate via an advanced computer network, for example a private local broadband data wireless area network (MESH) or a commercially available cellular network. The player module allows all players on the golf course to access all functions represented in FIGS. 1-24, which include document access, real-time wind information, real-time notices from tournament officials, note insertion, ruling request, score entry, and score audit.

As a player enters their score and the score for the person for which they are marking, those scores are transmitted via a private local broadband data wireless area network (MESH) or a commercially available cellular network to a commercially hosted website or a private on-site hosting system. Additionally, in the event of communication failures, the scores are retained on the portable handheld device to be transmitted when communications are resumed or may be accessed by Bluetooth, FireWire, or similar, connection.

The score tent module provides access to the players' scores via a commercial hosted web site or an on-site dedicated hosting system or a FireWire, or similar, connection with the players portable handheld device, and allows the player and his marker and a tournament official to electronically sign an electronic representation of the players scorecard. That module also provides for a timestamp and archiving of the scorecard. The player's score is to be transmitted from the players module to the score tent module via a private local broadband data wireless area network (MESH) or a commercially available cellular network. In the case of wireless failure, scores may be transmitted via a hard wire connection.

The archive module provides for each player's notes that have been incorporated into the electronic yardage book, pin sheet, and/or greens maps to be archived and accessed by the player in following rounds or after the tournament is completed.

In some embodiments the portable handheld devices are owned and provided by the tournament officials. In some embodiments portable handheld device may be owned and provided by each individual player with permission of the tournament officials.

In some embodiments, specific executable instructions (for example, computer-readable code embodied on a computer-readable medium, including graphic interfaces, or other operating system data) may be preloaded to handheld device in order to minimize the amount of data to be delivered to the devices during play of the sporting event, thus reducing the bandwidth required to transmit information to the device in real time during the event. This will minimize response times during operation of the system and minimize the system's bandwidth usage. For instance, pictures, graphics, documents, screen layouts may be content preloaded onto the portable handheld device.

In some embodiments all data shown on the portable handheld devices may be accessed through a commercially available web browser or similar commercially available system.

The scores entered by the player or marker can be accessed and reviewed by tournament officials and broadcast personnel so that the scores of the players may be displayed in real time to broadcast viewers or gallery members.

Typically, a MESH (802.11n technology with integrated RF intelligence) or similar network, properly configured, can be expected to cover a large area (e.g., up to about 500 acres) for the transmission of data to and from the various components, for example, the player, score tent, and archive modules. The display screens can be implemented on commercially available hand-held devices suitable to receive MESH signals (802.11n technology with integrated RF intelligence) or similar signals, configured to process, store, and display the data in pre-formatted screens, including logos, advertisements, or other visual representations. Additionally, cellular service, whether public or private, may be used to cover the golf course for the transmission of data to and from the various components.

FIG. 1 illustrates a first screen that a player will view on a display of the portable handheld device when the system is initiated. That screen shows a name of the player 1 to which the device has been issued, tournament name and details 2, a current round of the tournament 3, details of the player's round 4, and the player's playing partners 5, including the partner for which he will be marking. At the beginning of around, the player touches the START PLAY button 6 which will recall the hole screen which represents the player's first playing hole.

Figure 2:
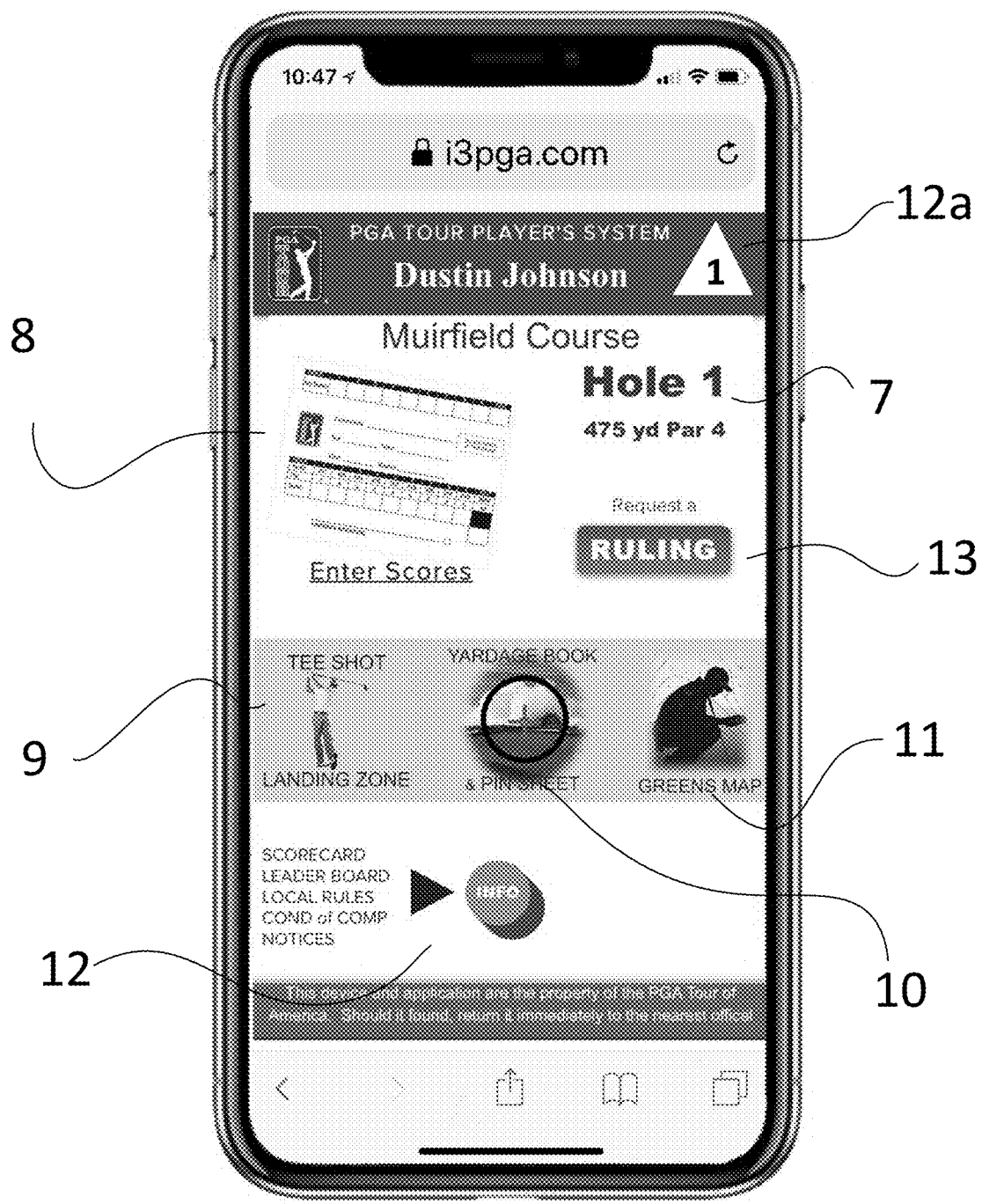
FIG. 2 illustrates a control screen for a specific hole on the golf course on a portable handheld device from which all documents are obtained and all functions are initiated according one embodiment of the present disclosure.
Figure 2:
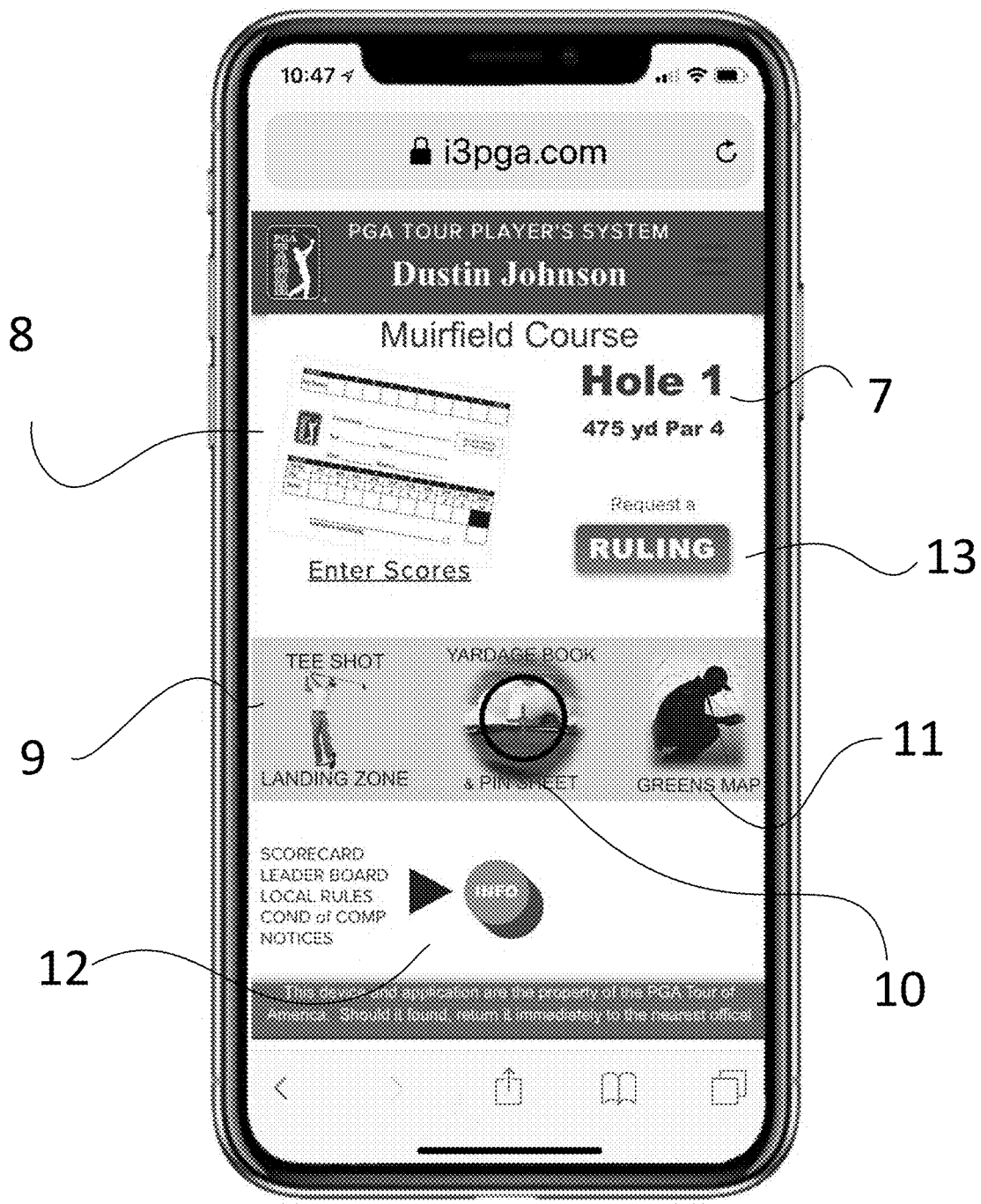

FIG. 2 illustrates a screen from which information for a certain hole may be obtained by the player on the portable handheld device. Hole information 7 includes the hole number, the yardage of the hole, and the hole par value. To retrieve information about the hole, the player would touch a tee shot landing zone 9, a yardage book and pin sheet 10, or a greens map 11. To retrieve general information about the tournament including the player's scorecard, a tournament leaderboard, the local rules, the conditions of competition, and current notices to players, the player would touch an INFO button 12. To request a ruling from the tournament officials the player would press a RULING button 13. To record the player score for the indicated hole and the score for the player for which he is marking, the player would touch the picture of a scorecard 8. When the tournament officials issue a new notice to players, an alert symbol 12a is displayed on any screen in a common location. The alert symbol 12a indicates a notice number and the notice is displayed by touching the notice on the display.

FIG. 3 illustrates a screen that is recalled when the tee shot landing zone 9 button is touched. The entirety of the hole is displayed with major features and distances to features which are in range of a player's tee shot 14. A compass rose 15 is included to assist the player in wind direction. A button 16 that may be touched to show the wind direction of speed if such a function is allowed by the tournament committee and the rules of golf.

Figure 4:
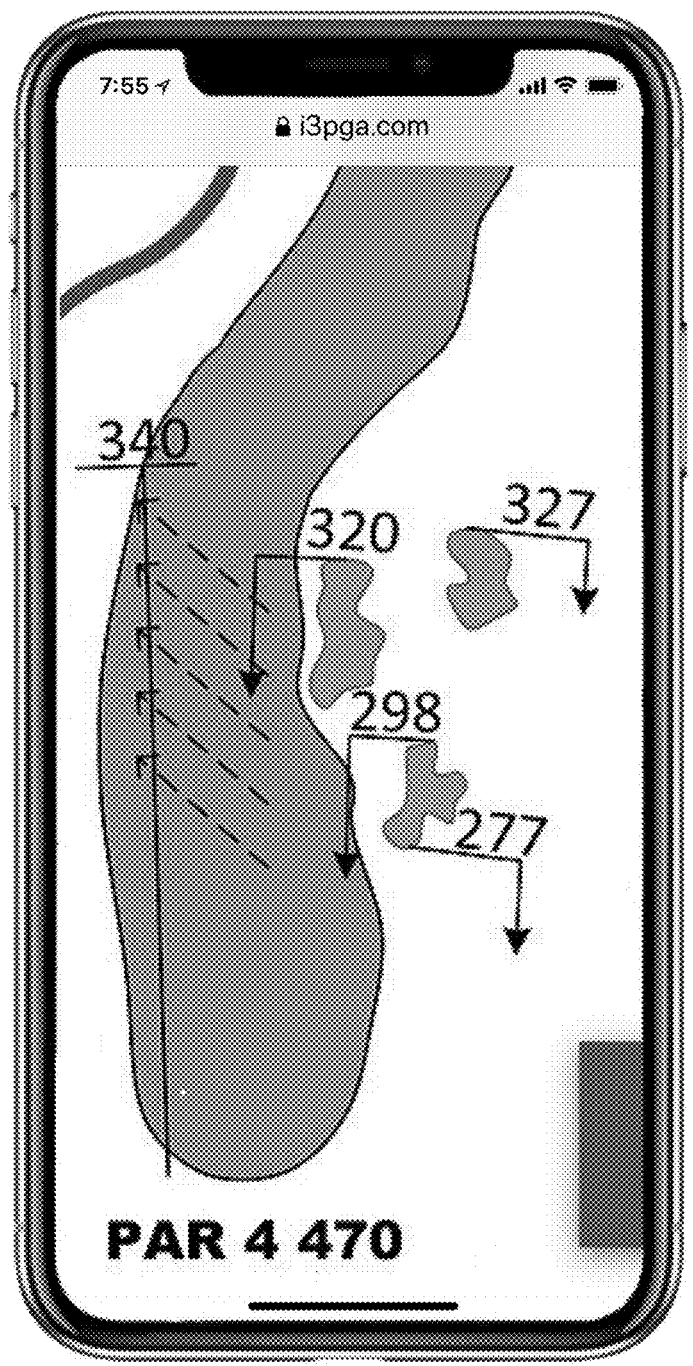
FIG. 4 illustrates a view of tee shot documentation from a yardage book document for additional detail of a specific hole on the golf course as shown on a portable handheld device according to one embodiment of the present disclosure.

FIG. 4 illustrates a zoomed-in portion of FIG. 3 and preferably is available on all screens but is particularly useful on the screens illustrated in FIGS. 3, 5, 7, and 8. Using "finger stretch" and "finger pinch" the user may soon in and out on the screen to show more detail.

Figure 5:
FIG. 5 illustrates an electronic representation of an area where a player's ball is located on a specific hole on a golf course from a yardage book document as shown on a portable handheld device according to one embodiment of the present disclosure.

FIG. 5 illustrates the screen that is a recalled when the yardage book & pin sheet 10 of FIG. 2 is touched. The area of a hole where the player is standing is retrieved from the yardage book and displayed with major features of a course 17, a location, labeling and distance from the front of the green of a sprinkler head 18 located on the course, an approximate location of the player in reference to that area of the yardage book shown as a golfer silhouette 19, a compass rose 21, and a distance to the front of the green from a major feature of the course 20. A button 22 may be touched to show the wind direction of speed if such a function is allowed by the tournament committee and the rules of golf. A PIN SHEET arrow 23 indicates that a pin sheet may be viewed by scrolling down on this displayed screen. Unlike a paper yardage book with limited space, the entirety of the hole with all features can be displayed using scroll features.

As described herein, embodiments of the present disclosure can incorporate Global Positioning System (GPS) technology to provide location information about a particular golfer. The GPS information can be accessed and processed by the portable handheld device to provide location so as to position the golfer silhouette 19 of FIG. 5 on the yardage book 17 of FIG. 5. The golfer silhouette 19 will indicate a location of the golfer relative to major features of the golf hole and sprinkler heads which are marked so that the golfer may determine the closest known labeled point in the yardage. Currently, GPS information is not allowed in professional golf events to obtain the distance to features, including the pin. However, should that policy change, the GPS information could also be used to determine distances to all features by merely touching the feature in question, including the pin.

Figure 6:
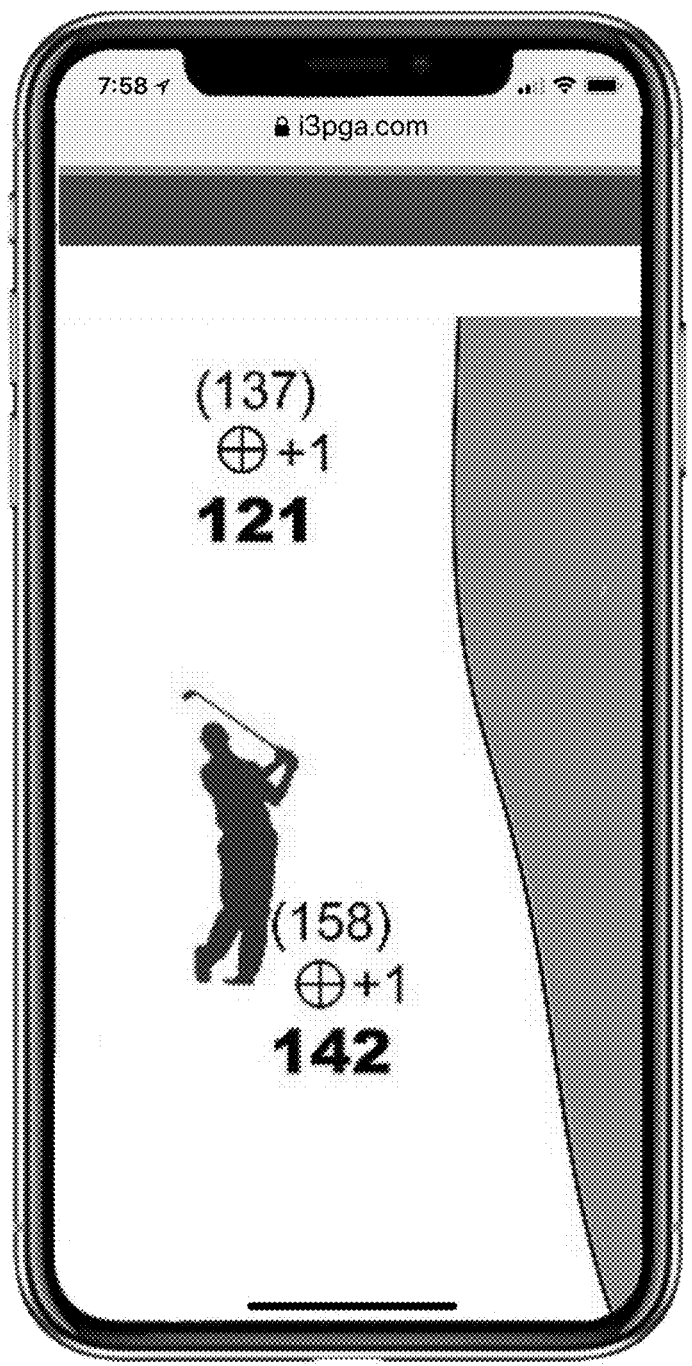
FIG. 6 illustrates a zoomed view of the display of FIG. 5, for additional detail, as shown on a portable handheld device according to one embodiment of the present disclosure.

FIG. 6 illustrates this zoom function of FIG. 5 which is available on all screens but is particularly useful on the screens displayed in the illustrations of FIGS. 3, 5, 7, and 8. Using "finger stretch" and "finger pinch" the user may soon in and out on the screen to show more detail.

Figure 7:
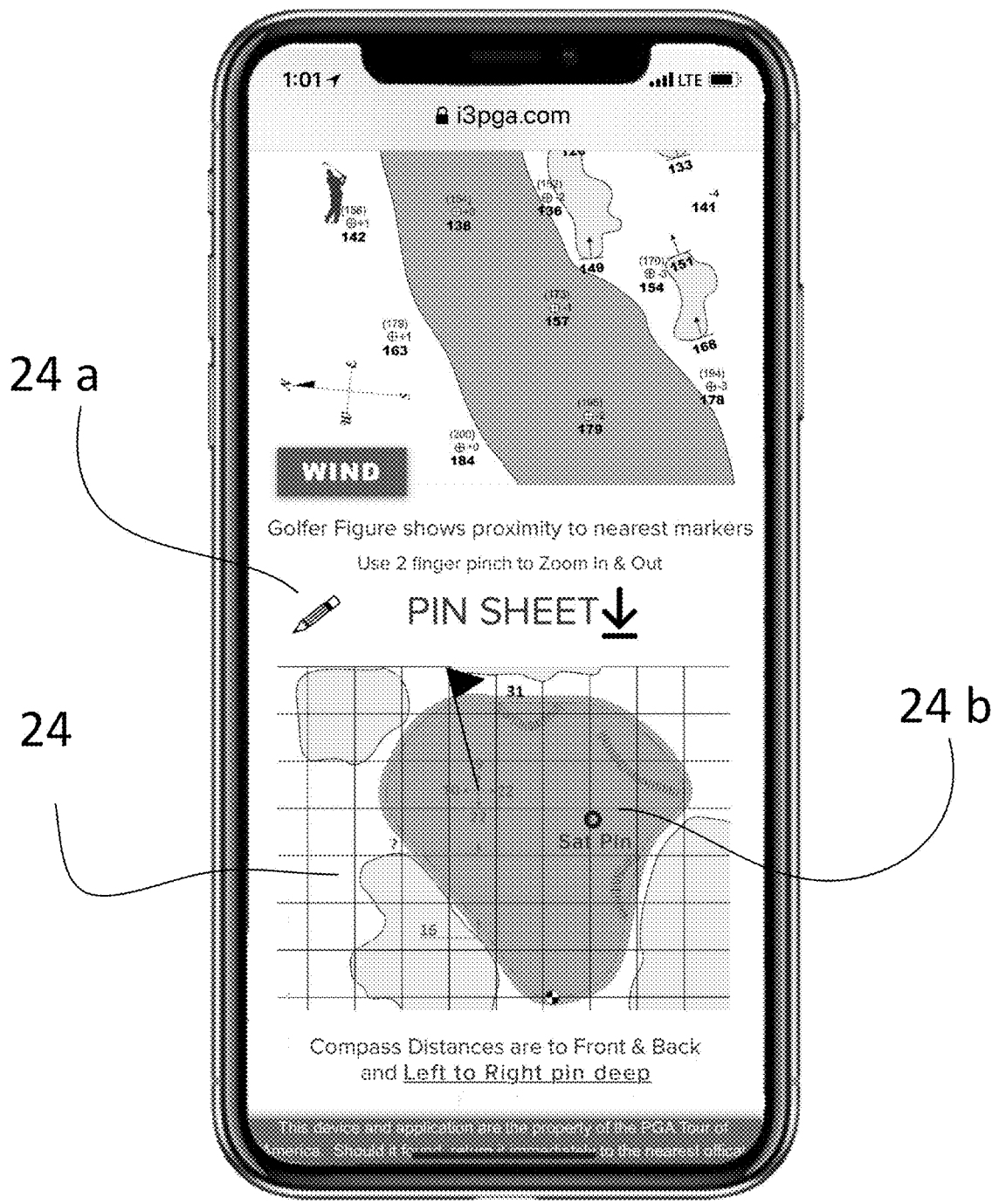
FIG. 7 illustrates an electronic representation of a pin sheet for a specific hole on a golf course that has been incorporated as part of a yardage book as illustrated in FIG. 5, and as shown on a portable handheld device according to one embodiment of the present disclosure.

FIG. 7 illustrates the scroll down function 23 shown in FIG. 5 to display the pin sheet for the specific hole. A pin sheet screen 24 that is displayed by scrolling down is illustrated in FIG. 7. That item provides the golfer with a view of the current hole green showing the position of the flagstick, distances from the front, back, left, and right of the green, and "carry distances" of obstructions. Item 24a represents a tool that provides for marking the location of the next day's pin placement. The location of the next day's pin placement is often marked on the green with a painted dot. Caddies will find the dot and step of the distance to the edges of the green or to certain features on the green. By touching item 24a with a stylus or finger and then touching a position on the green, the location of the next day's pin 24b is automatically marked and labeled. Additionally, a 5-yard grid is overlaid for assistance in shot distances, and the zoom function is available for greater detail.

Figure 8:
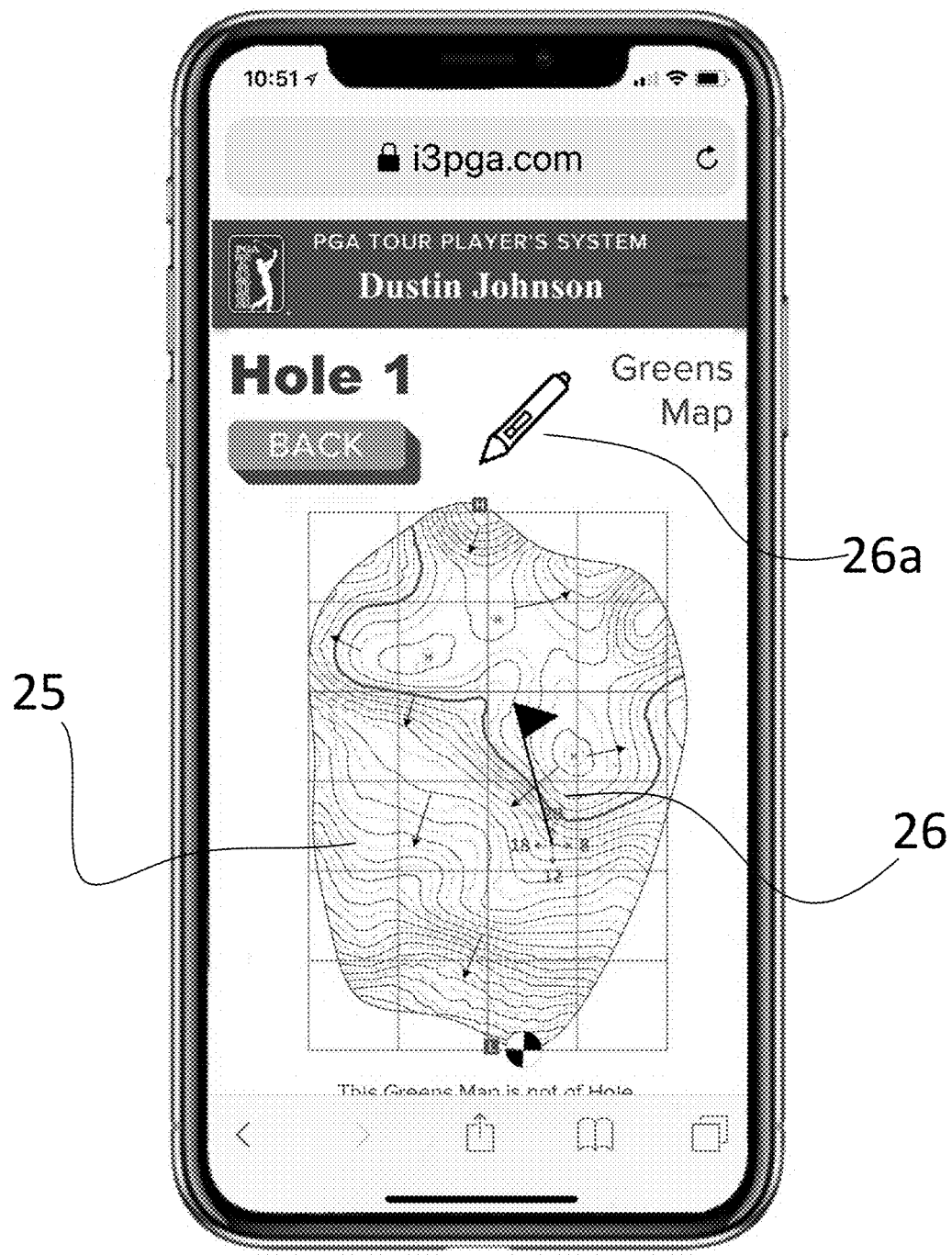
FIG. 8 illustrates an electronic representation of a greens map for a specific hole on a golf course from a greens map book document as shown on a portable handheld device according to one embodiment of the present disclosure.

FIG. 8 illustrates a screen that is recalled when the greens map 11 portion of FIG. 2 is touched. A contour map 25 of the green with an overlaid 5-yard grid is also shown in FIG. 8. The contour map 25 can assist the player in reading the direction of putts on the green. In addition, a pin location 26 is also displayed. A stylus symbol 26a is shown that when touched allows for notes to be written and lines to be drawn on the greens map. These notes and lines will remain on the greens map for future rounds of golf during the tournament or for post tournament archiving. Additionally, the "next day's pin placement" function described above may be utilized on this screen displayed on the portable handheld device.

Figure 9:
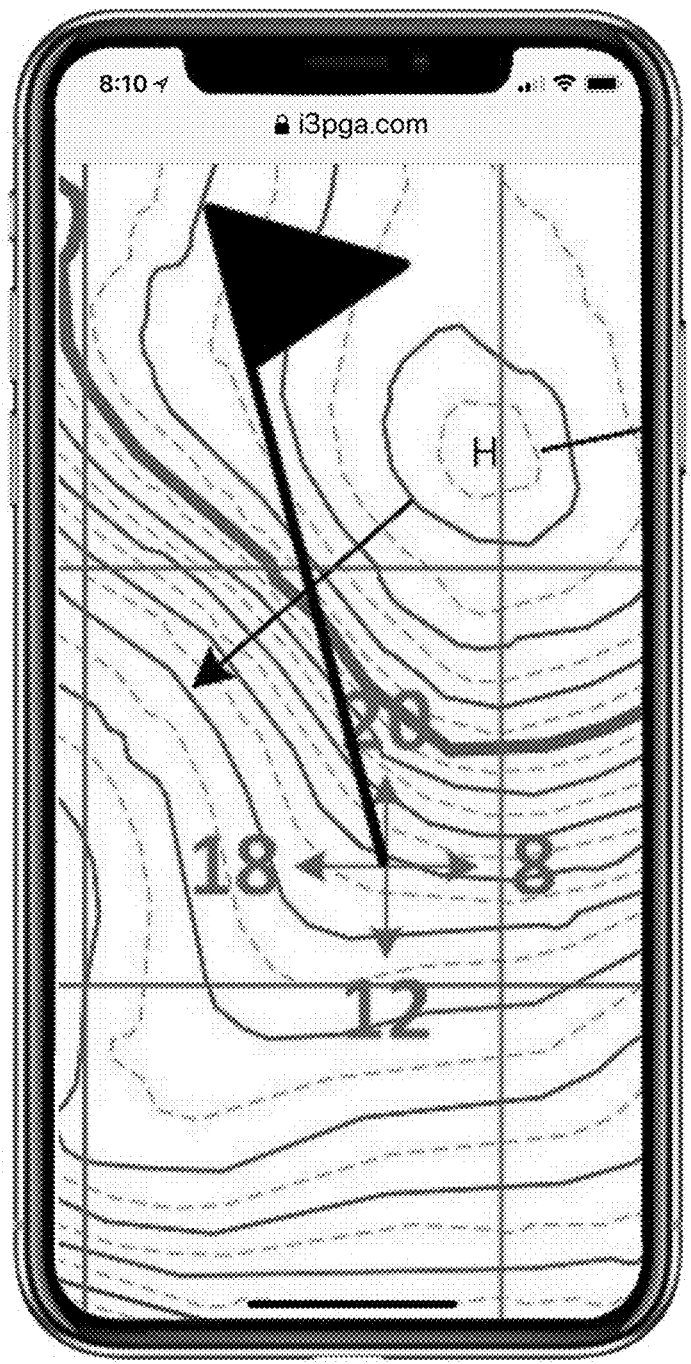
FIG. 9 illustrates a zoomed view of a greens map for additional detail of a specific hole on the golf course as shown on a portable handheld device according to one embodiment of the present disclosure.

FIG. 9 demonstrates the use of the "finger stretch" and "finger pinch" to zoom in and out on FIG. 8 to show greater detail.

Figure 10:
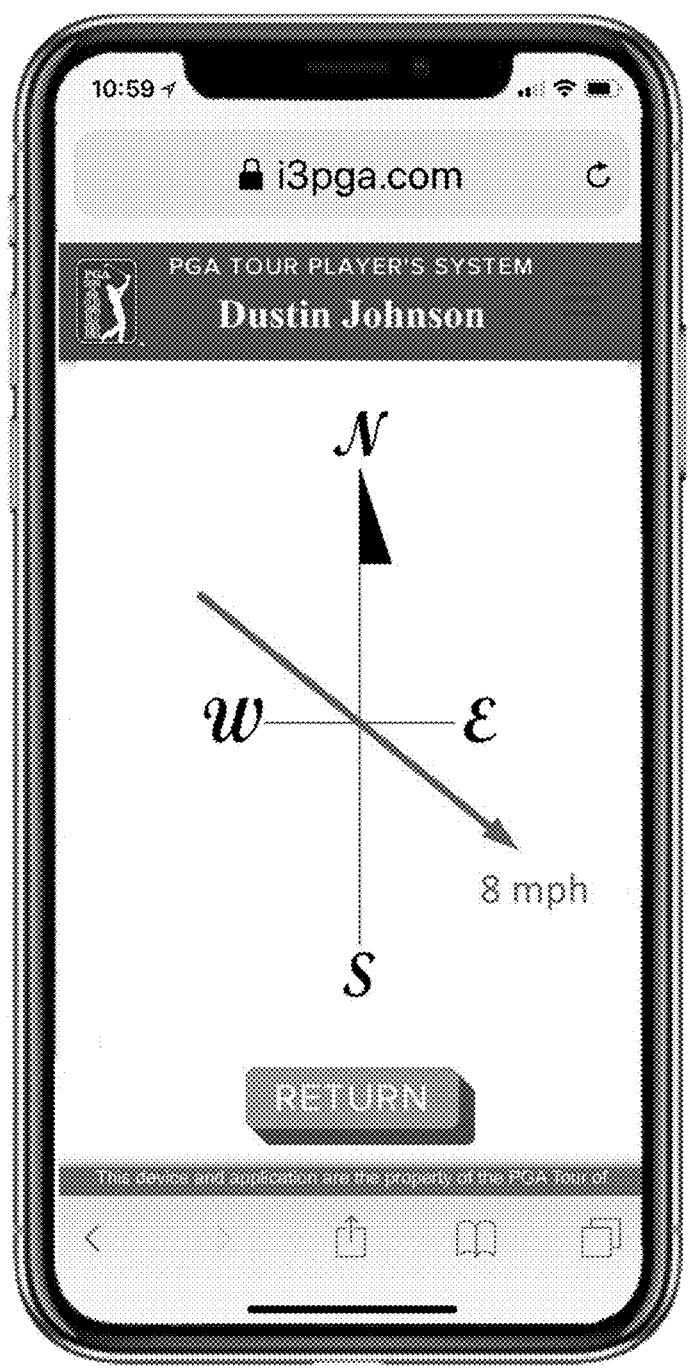
FIG. 10 illustrates a presentation of wind information which may be accessed from a "WIND" button that appears on the screens represented by FIG. 3 and FIG. 5 according to one embodiment of the present disclosure.

FIG. 10 illustrates the screen that is recalled and displayed on the portable handheld device when the compass rose 15 of FIG. 3 and wind 22 portion of FIG. 5 are touched. The screen represents a compass rose and the direction and speed of the wind at a specific location on the golf course. That location may be specific to a hole or general to the golf course. Comparing the compass rose on FIG. 10 with the compass roses on FIGS. 3 and 5 can assist the player in calculating wind affects for an upcoming shot. It is noted that this function may only be provided if the committee tournament and or the rules of golf allow the information to be distributed to players.

Figure 11:
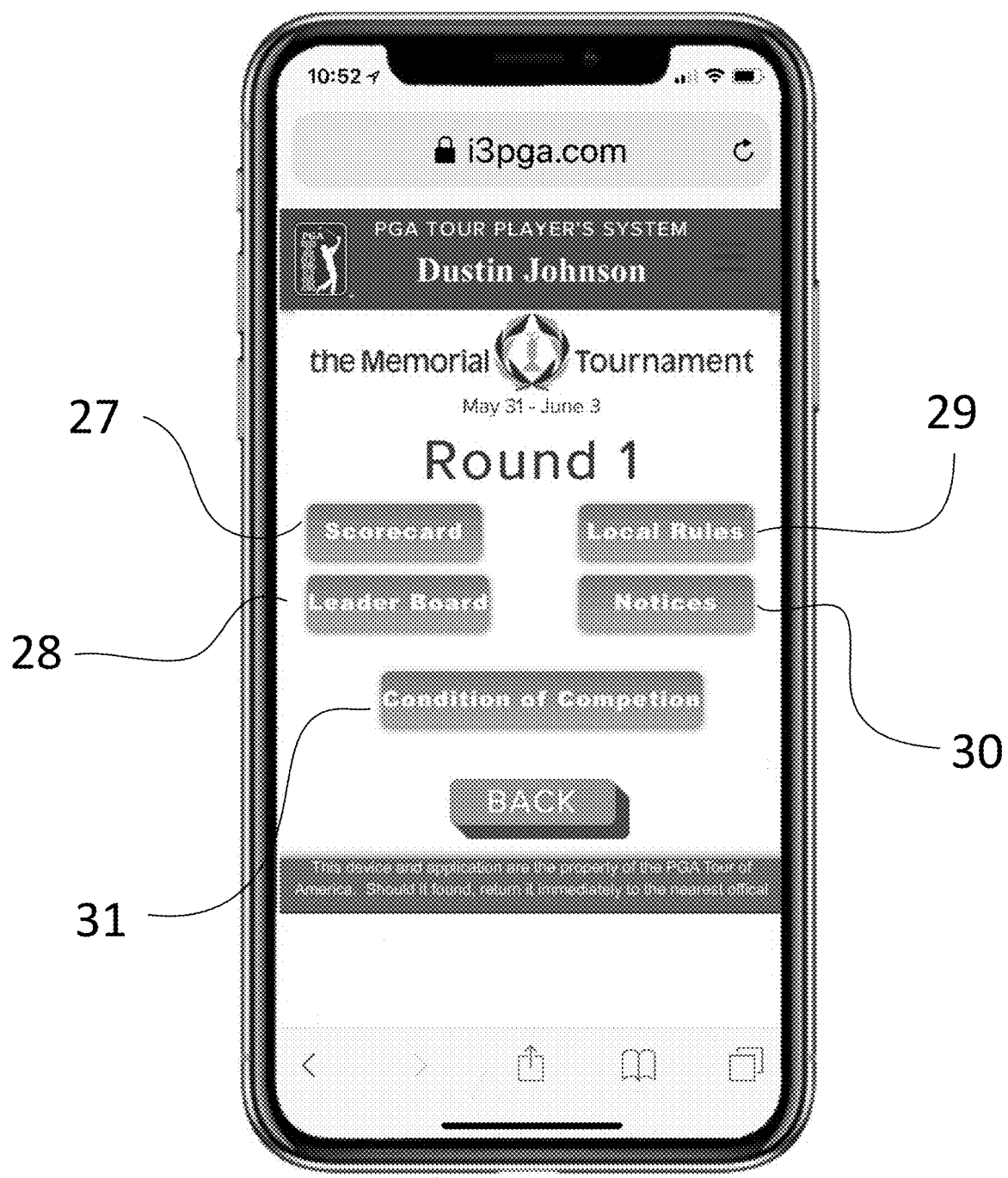
FIG. 11 illustrates a document selection screen as shown on a portable handheld device according to one embodiment of the present disclosure.

FIG. 11 illustrates the screen recalled when the info button 12 of FIG. 3 is touched. The screen provides a choice of documents provided by the tournament committee to the player for immediate and convenient review by the player. Those documents are a player's scorecard 27, a tournament leaderboard 28, tournament local rules 29, any NOTICES to players issued by the tournament committee 30, and the tournament conditions of competition 31. All the reference documents may be recalled by touching the associated button. Additional documents can be incorporated as needed.\d 1

Figure 12:
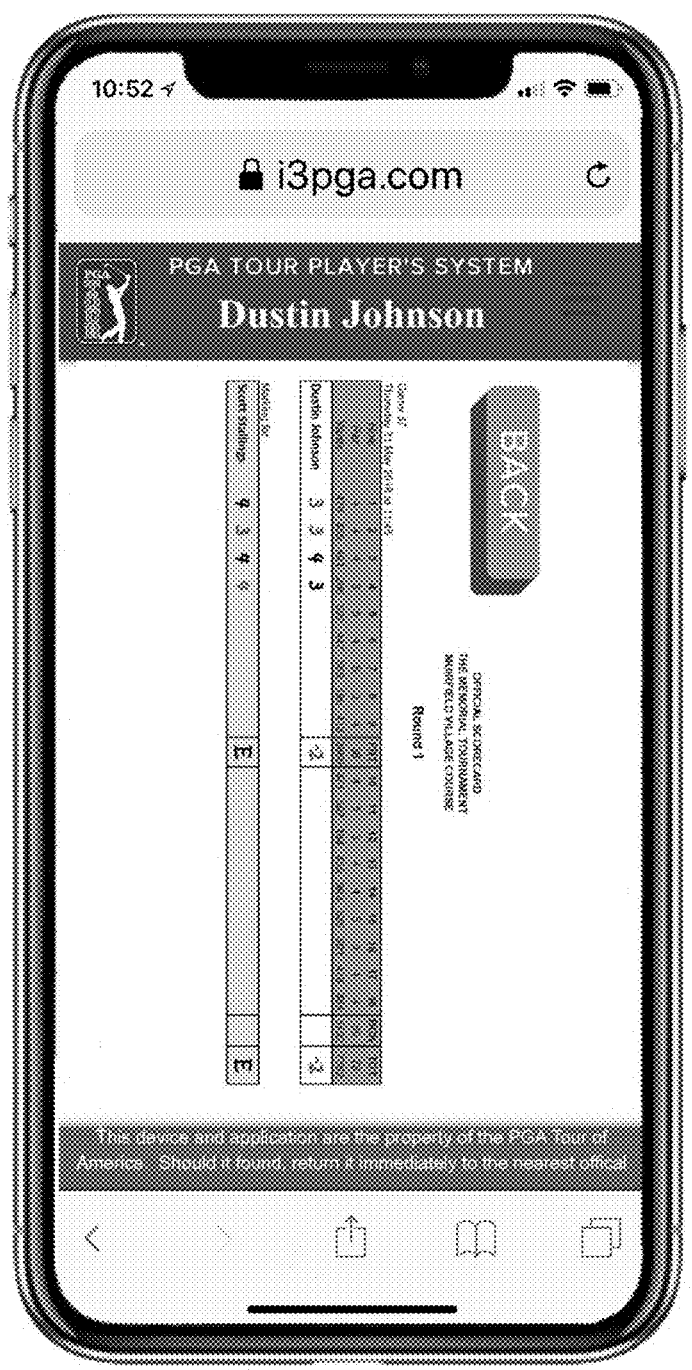
FIG. 12 illustrates a player's official scorecard showing scores that the player entered for his round of golf and for his playing partner's, for which he is serving as a marker according to one embodiment of the present disclosure.

FIG. 12 illustrates a screen that is recalled when the players scorecard 27 of FIG. 11 is touched. The screen displays the player's official scorecard which includes the player's score for each hole as well as the score on each hole for the playing partner for which the player is serving as a marker. It is noted that the official score for a player is the score that the marker records and not the score that the player himself.

Figure 13:
FIG. 13 illustrates a leader board for a tournament as shown on a portable handheld device according to one embodiment of the present disclosure.

FIG. 13 illustrates a screen that is recalled when the tournament leaderboard 28 of FIG. 11 is touched. The screen displays the tournament scoreboard for the leaders of the event.

Figure 14:
FIG. 14 illustrates an electronic representation of local rules for a tournament as shown on a portable handheld device according to one embodiment of the present disclosure.

FIG. 14 illustrates a screen that is recalled when the tournament local rules 29 of FIG. 11 is touched. The screen displays the LOCAL RULES that are issued by the tournament committee.

Figure 15:
FIG. 15 illustrates an electronic representation of a notice to players for a tournament as shown on a portable handheld device according to one embodiment of the present disclosure.

FIG. 15 illustrates a screen that is recalled when the NOTICES 30 of FIG. 11, or when 12a of FIG. 2, is touched. The screen displays any NOTICES that the tournament committee has issued to the players. These notices can be issued at the beginning of play and/or in real time during play. Issuance of a notice may be indicated by a specific symbol, 12a of FIG. 2, displayed on any screen in a reserved area, i.e., the top right corner, etc.

Figure 16:
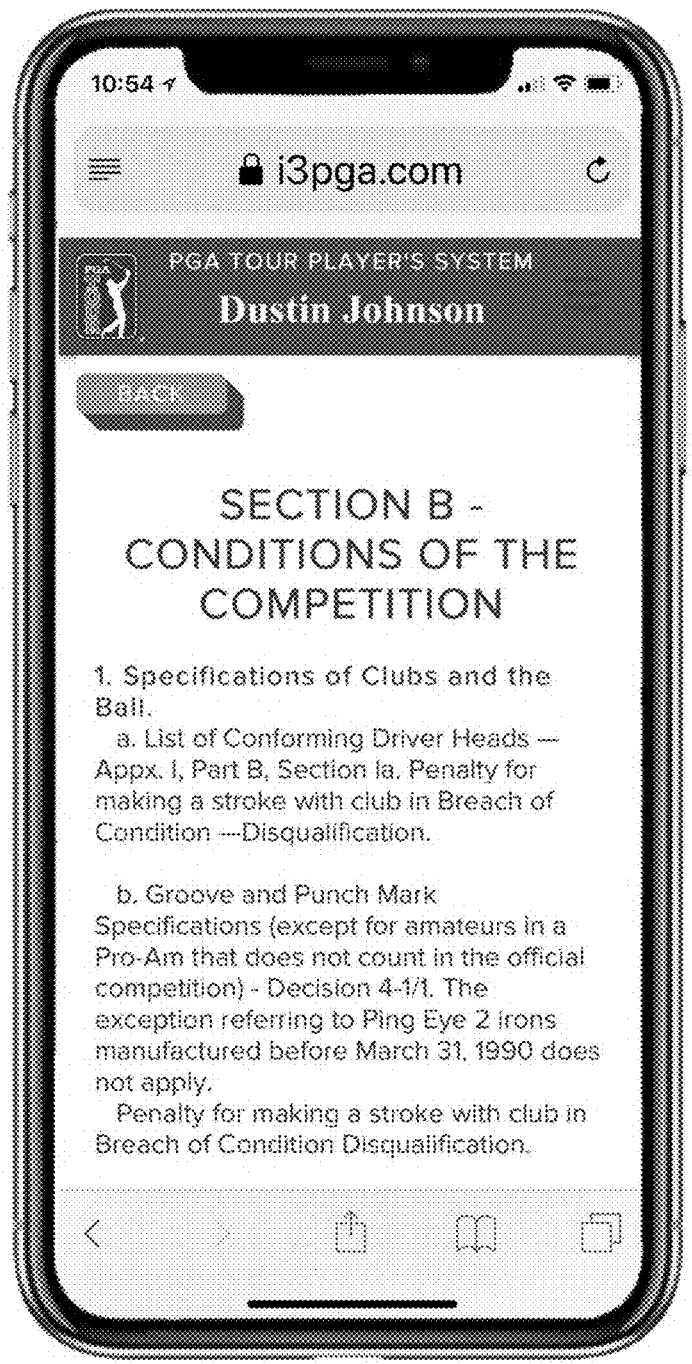
FIG. 16 illustrates an electronic representation of conditions of the competition for a tournament as shown on a portable handheld device according to one embodiment of the present disclosure.

FIG. 16 illustrates a screen that is recalled when the tournament conditions of competition 31 of FIG. 11 is touched. The screen displays the Conditions of Competition for the event which are issued by the tournament committee.\d 1

Figure 17:
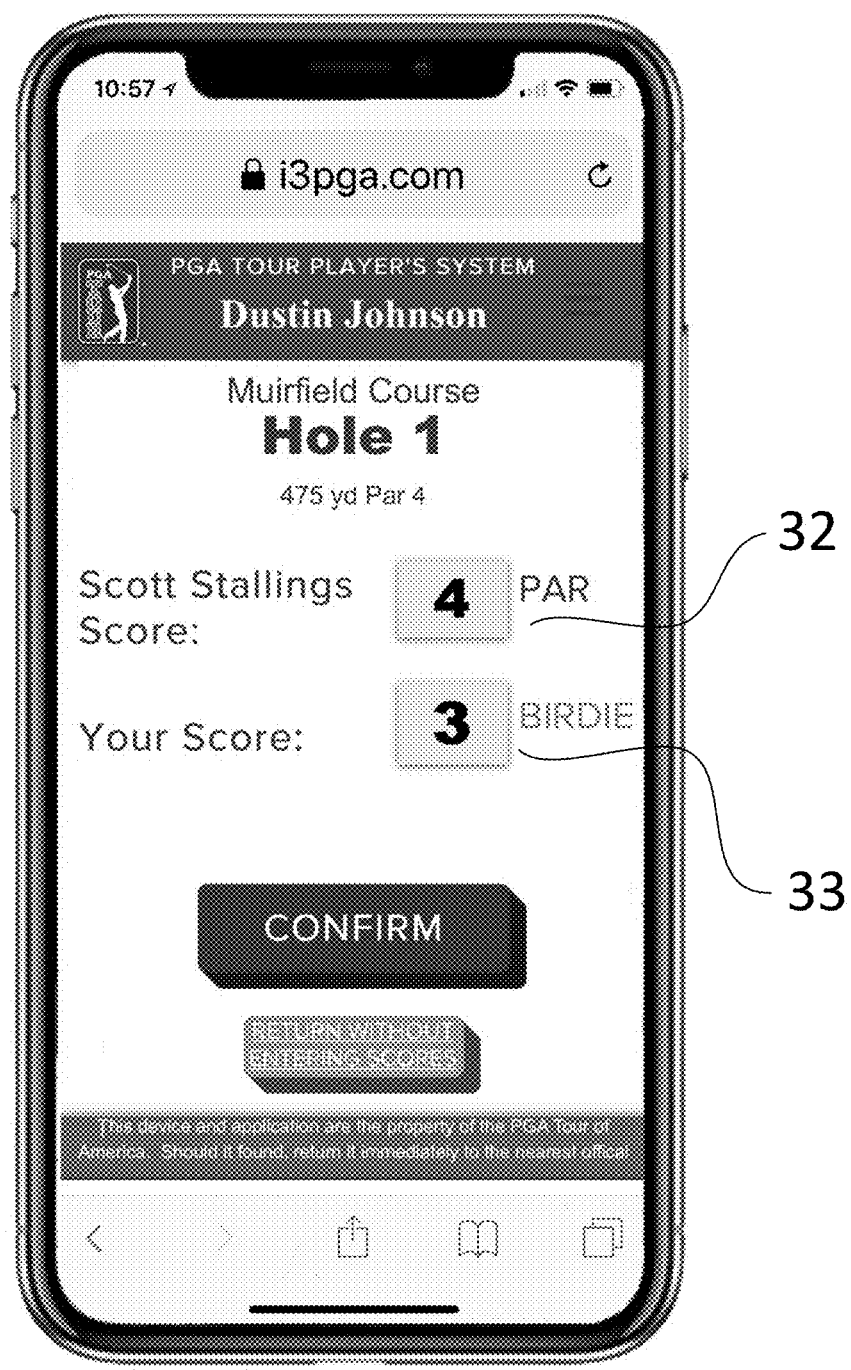
FIG. 17 illustrates a screen by which a player enters a score of his competitor for which he is serving as a marker and the player's own score on a portable handheld device according to one embodiment of the present disclosure.

FIG. 17 illustrates a screen that is recalled when the scorecard 8 of FIG. 2 is touched. The screen provides player with the ability to enter a score of his playing partner 32 for which he is serving as the marker and a player's own score 33. Additionally, the system will indicate the golf terminology for the scores entered, i.e., ACE, DBL EAGLE, EAGLE, BIRDIE, PAR, BOGIE, DBL BOGIE, etc., for confirmation.

Figure 18:
FIG. 18 illustrates a screen by which a player begins a request for a ruling from a tournament official by selecting an area of an indicated hole on a portable handheld device according to one embodiment of the present disclosure.

FIG. 18 illustrates a screen that is recalled when the ruling button 13 of FIG. 2 is touched. The screen allows the player to initiate a rulings request by indicating a general area on a hole 34, where the player is located; TEE BOX, 2nd SHOT, 3rd SHOT, GREEN 35. The player location 35 is automatically assigned depending upon the hole on which the player was playing known by the last score entered or the GPS ability of the portable handheld device. Only the buttons in the "Area" 35 are active with the exception of the "CANCEL" button at the bottom of the screen. That button halts the request process and recalls the previous screen. It is possible that the function of the player location 35 could be automatically utilized using the GPS functions of the handheld device.

Figure 19:
FIG. 19 illustrates a screen by which a player continues a request for a ruling from a tournament official by selecting side of a hole on a portable handheld device according to one embodiment of the present disclosure.

FIG. 19 illustrates a screen which provides additional information about the players location, i.e., whether the player is located on the left side or right side of the golf hole. The two buttons 36 are the only buttons that are active with the exception of the "CANCEL" button at the bottom of the screen. That button halts the request process and returns the player to the appropriate Hole screen, such as FIG. 2. It is possible that the function of buttons 36 could be automatically utilized using the GPS functions of the handheld device.

Figure 20:
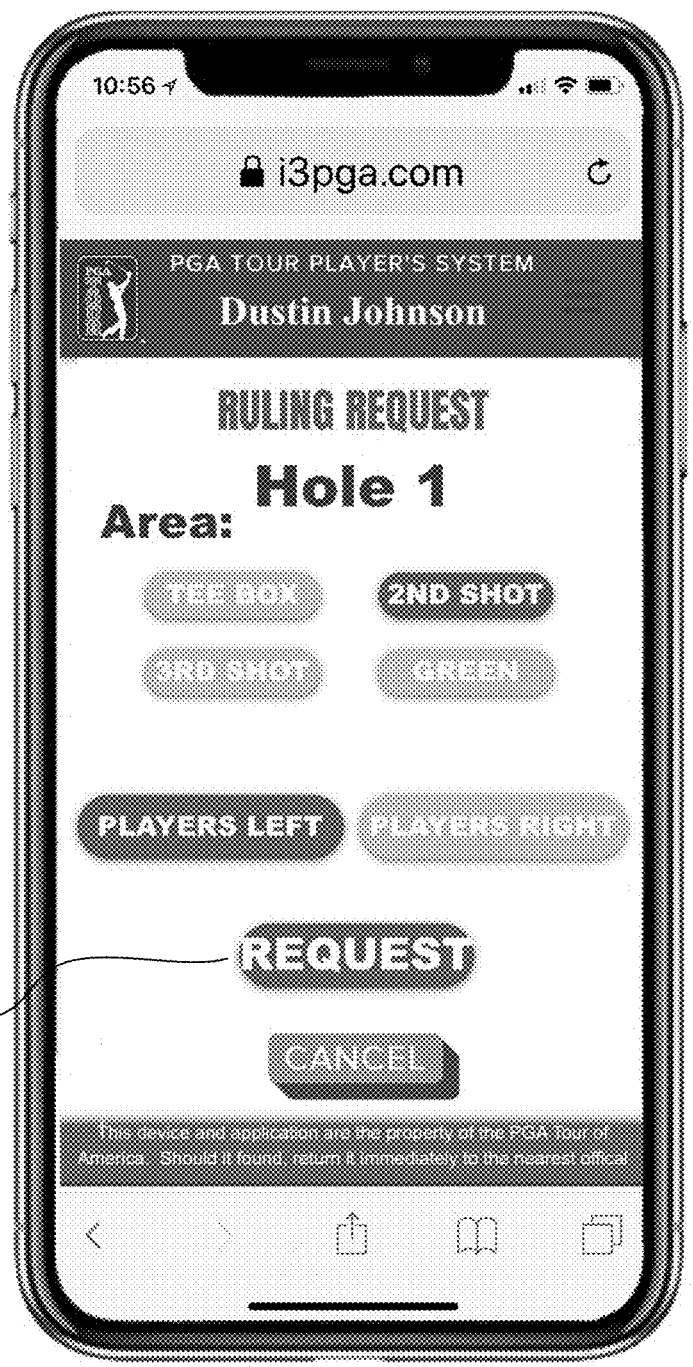
FIG. 20 illustrates a screen by which a player finalizes a request for a ruling from a tournament official by selecting a "REQUEST" button on a portable handheld device according to one embodiment of the present disclosure.

FIG. 20 illustrates a screen that is displayed after a player selects one of the two buttons represented by buttons 36 on FIG. 19. After confirming that the proper area button 35 (FIG. 18) and the proper side button 36 (FIG. 19) have been selected, the player would touch a REQUEST button 37. Alternatively, touching Cancel would return the player to the screen represented in FIG. 2 without requesting a ruling.

Figure 21:
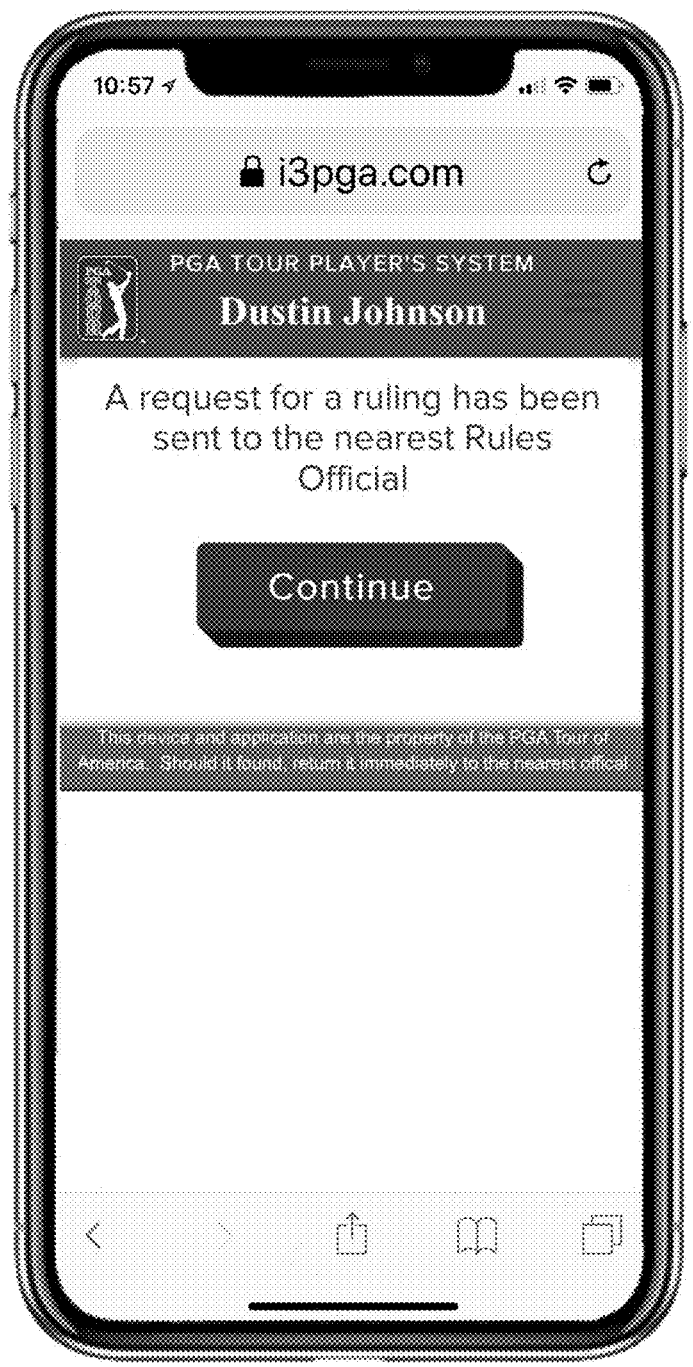
FIG. 21 illustrates a screen by which a player's request for a ruling is confirmed on a portable handheld device according to one embodiment of the present disclosure.

FIG. 21 illustrates a screen that is displayed after a player touches the REQUEST button 37 (FIG. 20). The screen confirms that all rules officials have received a message, such as a text message, stating the players name, the golf hole on which the player is currently located, the area of the hole on which the player is currently located, and the side of the golf hole on which the player is located.

Figure 22:
FIG. 22 illustrates a message that will be displayed on the portable handheld devices used by the tournament committee and/or the tournament rules officials when a player request a ruling according to one embodiment of the present disclosure.

FIG. 22 illustrates a message that will be displayed on the portable handheld devices used by the tournament committee and/or the tournament rules officials when a player request a ruling by touching the REQUEST button 37 (FIG. 20). That message may be in the form of a PUSH NOTIFICATION, a text message, or a dedicated app screen.

Figure 23:
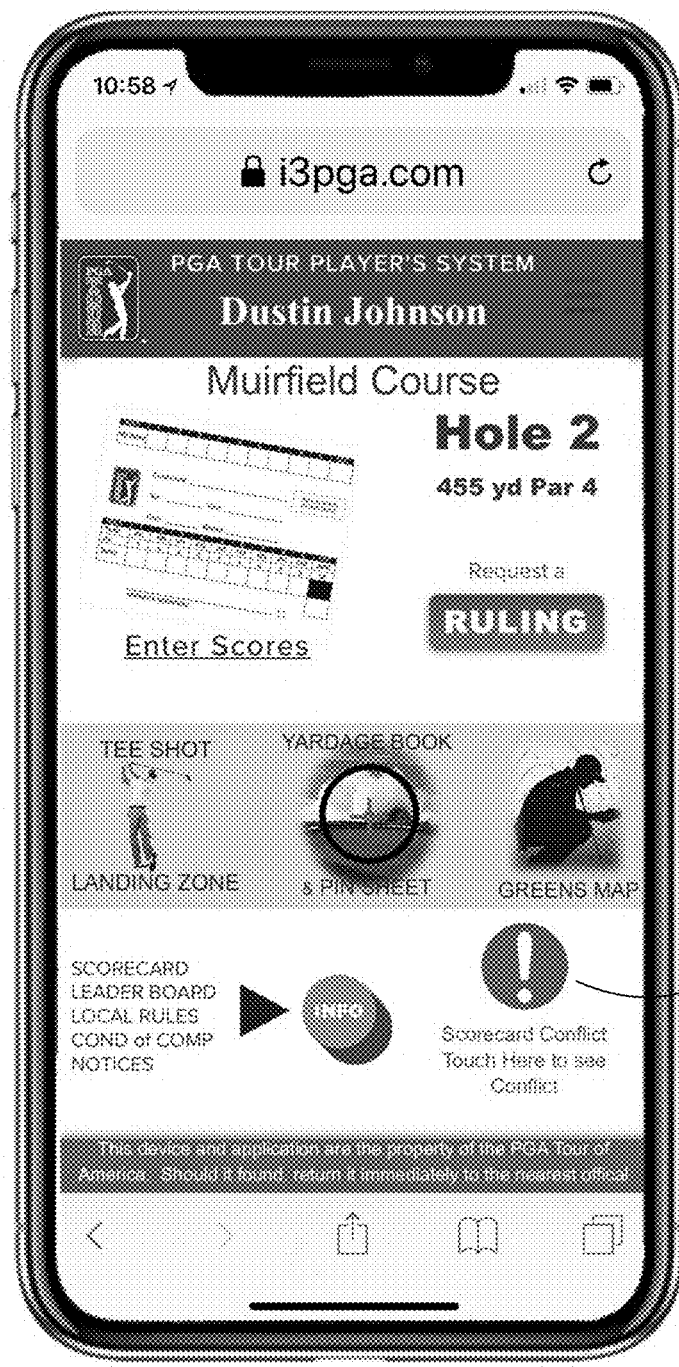
FIG. 23 illustrates a notification of a Scorecard conflict that indicates that a player's score and the markers score for that player do not agree as shown on a portable handheld device according to one embodiment of the present disclosure.

FIG. 23 illustrates a screen where the player is notified of a scorecard conflict. That notification is made by the presence of a warning symbol 38. A scorecard conflict exists when a player enters his own score 33 in the present disclosure via FIG. 17 and that player's marker enters a different score 32 for same player via FIG. 17 on the marker's portable handheld device. By touching a warning symbol 38, the player is directed to a screen (FIG. 24) which displays the specifics of the conflict. The warning symbol 38 will remain on every individual hole page (FIG. 2) until the conflict is resolved.

Figure 24:
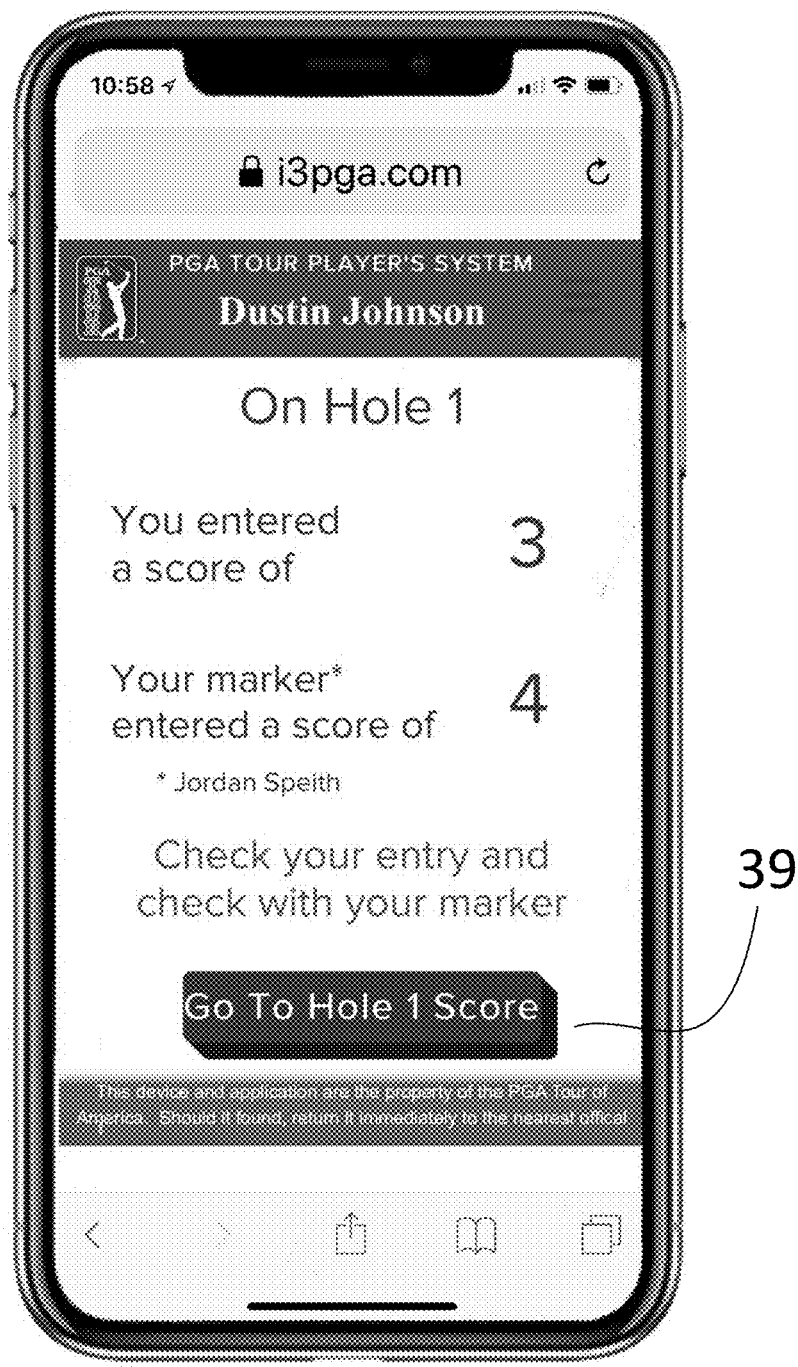
FIG. 24 illustrates specifics of the conflict in scores as presented in the notification shown in FIG. 23, and as shown on a portable handheld device according to one embodiment of the present disclosure.

FIG. 24 illustrates a screen that is displayed the warning symbol 38 of FIG. 23 is touched. That screen indicates the golf hole where the score entered by the player and the score entered by the player's marker are in conflict. Additionally, the scores entered by those two parties is displayed with the message for the player to resolve the conflict with his marker. When the conflict is identified it is corrected by button 39, which button will recall the screen where scores are entered (FIG. 17). It is noted that the warning symbol 38 on FIG. 23 will be displayed on the portable handheld unit of both the player and his playing partner which is serving as his marker. Additionally, both players are enabled to change the scores that they entered which were entered incorrectly.

Figure 25:
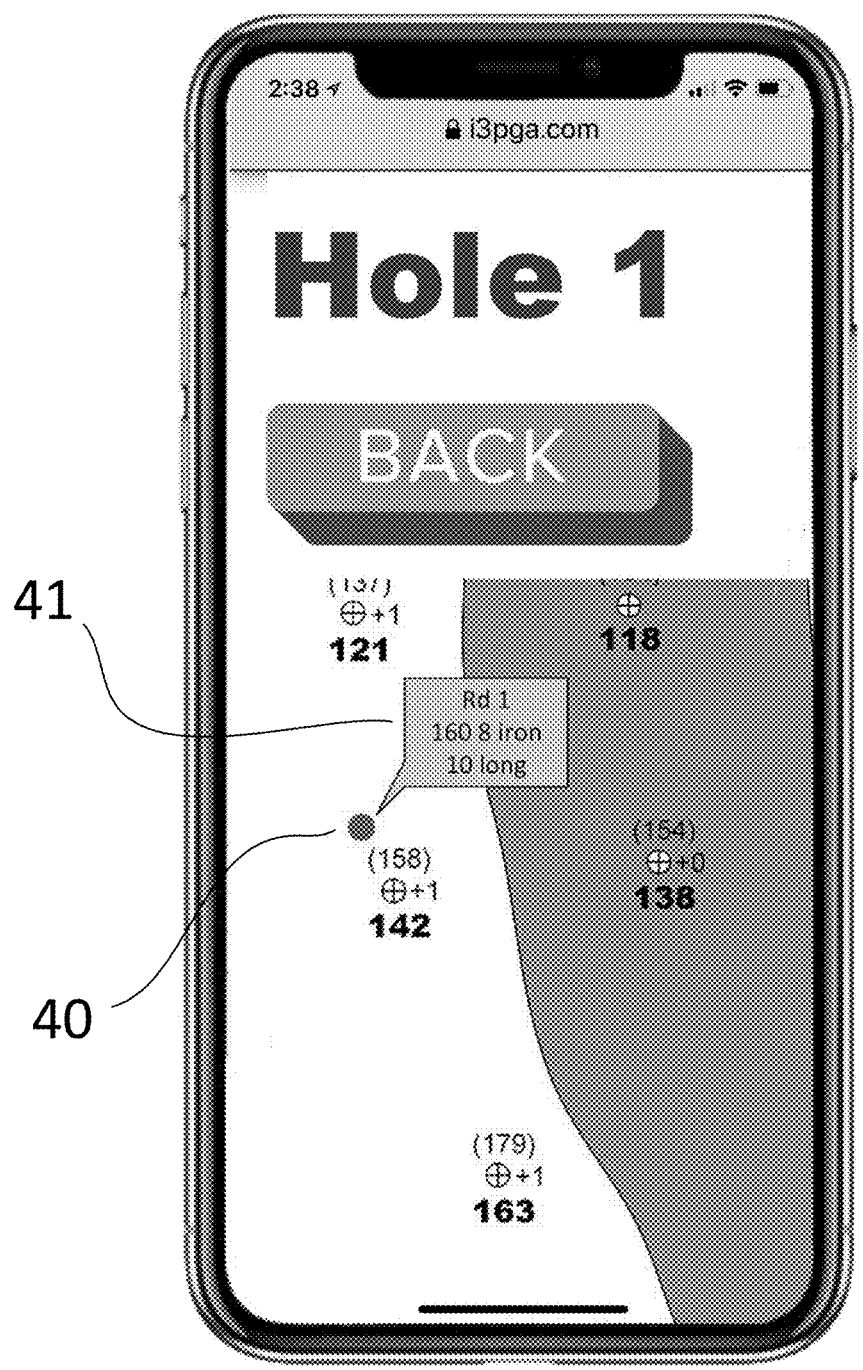
FIG. 25 illustrates notes that may be added to a yardage book (FIG. 5) either with a stylus or by verbal dictation when the golfer figure shown in FIG. 5 is touched, and as shown on a portable handheld device according to one embodiment of the present disclosure.

FIG. 25 illustrates at screen that is displayed when a player touches item 19 on FIG. 5. When the player touches the golfer silhouette 19, that silhouette changes to a red dot 40 and a dialog box 41 is opened so that the player May 1) dictate a note in the dialog box or 2) use a stylus to write the note. That red dot and dialog box will remain on the yardage book representation (FIG. 5) for all subsequent rounds and on the archives addition after the tournament is complete. It is also noted the feature discussed in this paragraph may be initiated by the player on his portable handheld device or on the caddie's portable handheld device. The dialog box is automatically labeled with the round of play, the date, time, temperature, and wind, and the GPS distance to hole, which distance is not available and shown until a prior round.

It is noted that the information retrieved by a player and the information transmitted by the player (scores) are dependent upon a working wireless network, whether a Wi-Fi MESH system, a cellular system, or other wireless system. Accordingly, in anticipation the wireless network might become inoperable or un-accessible, the information that is retrieved in real time may be stored on the portable handheld device before issuance to the player. Additionally, the scores entered by the player can be stored on the portable handheld device until communications with the wireless network are reestablished, at which time the scores are automatically transmitted. If communications are never reestablished, scores may be transmitted once the player arrives at the scoring tent via a Fire Wire cable or other such direct connection.\d 1

Figure 26:
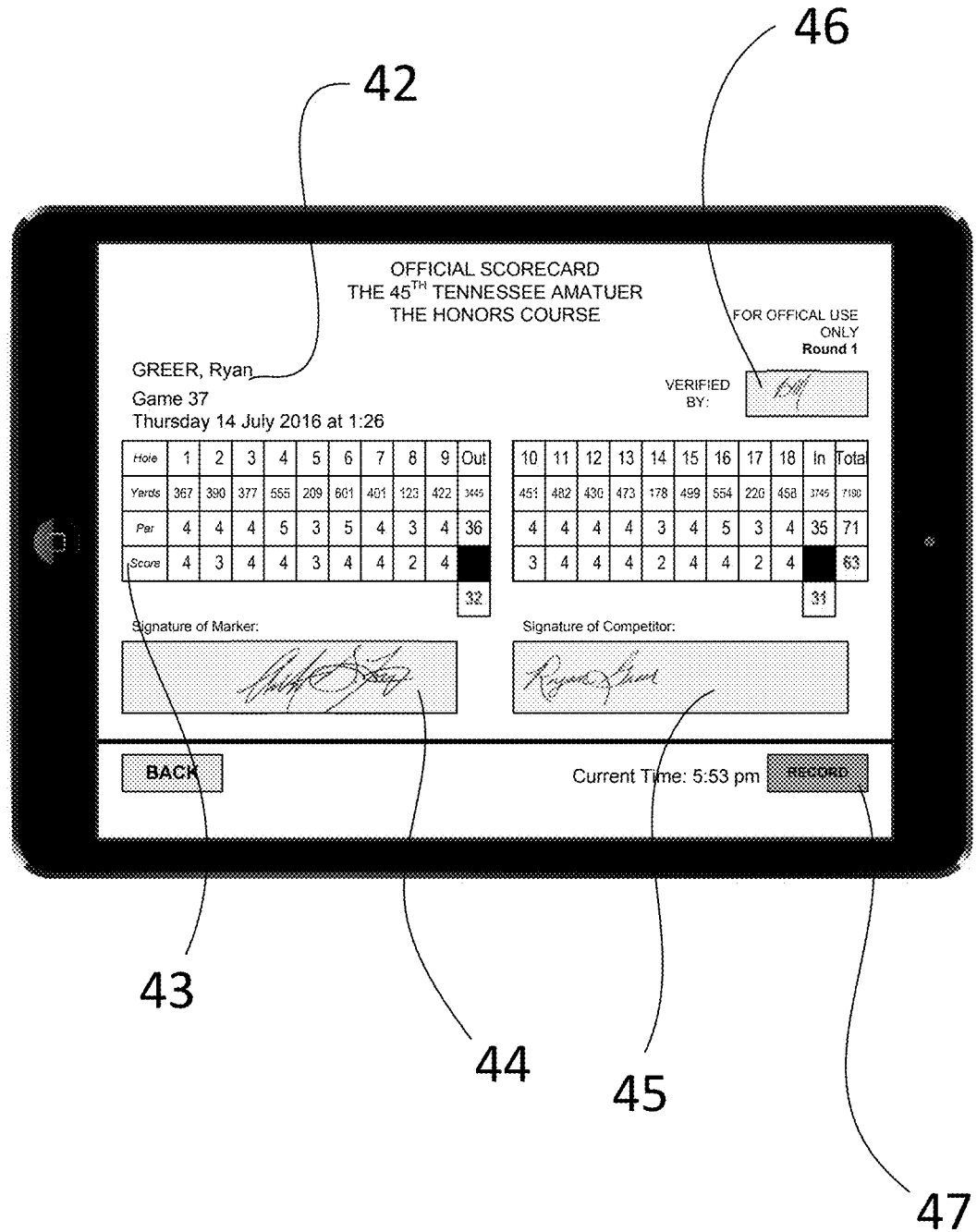
FIG. 26 illustrates a screen that is displayed on the score tent module when the player has completed his round according to one embodiment of the present disclosure.

FIG. 26 illustrates a screen that is displayed on the score tent module when the player has completed his round. That screen identifies the player and the round of golf the player has completed 42 and the player's scores recorded by the player's marker 43. If any conflicts in scores that were identified by the warning symbol 38 on the players portable handheld units (FIG. 23) but not resolved by the players on the course, those conflicts would be displayed on this screen by highlighting the hole and score with a yellow shading. If a score has not been entered by either player or marker, that hole will be highlighted in red. If there are no errors on the Scorecard and the player agrees with the scores reported, which scores have been transmitted from the player's marker's portable handheld unit, the player uses a stylus to sign the electronic Scorecard in area 45, the marker attests the score by signing in area 44, the scoring official initials the scorecard in area 46, and the player submits the Scorecard by touching the RECORD button 47.

Figure 27:
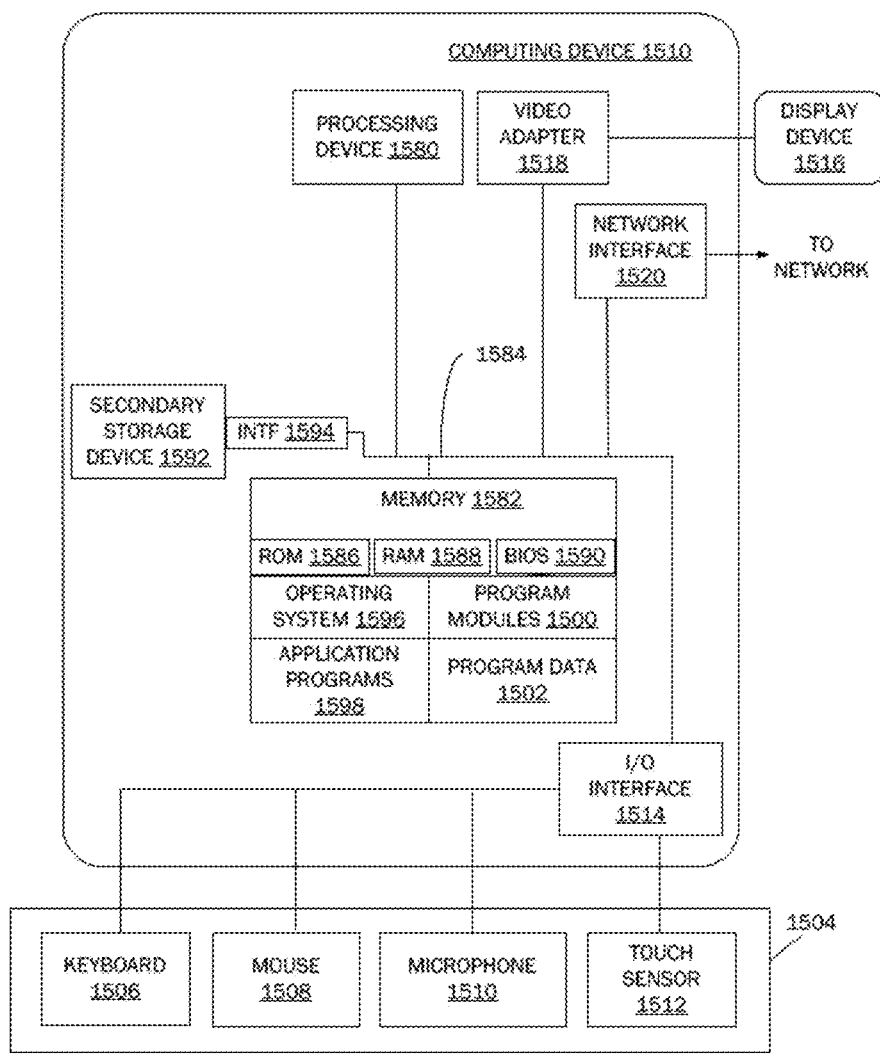
FIG. 27 illustrates an exemplary architecture of a computing device suitable to implement aspects of the present disclosure.

Referring now to FIG. 27, an exemplary architecture of a computing device that can be used to implement aspects of the present disclosure is illustrated. The computing device illustrated in FIG. 27 can be used to execute the operating system, application programs, and software modules (including the software engines) described herein.

The computing device 1510 includes, in some embodiments, at least one processing device 1580, such as a central processing unit (CPU). A variety of processing devices are available from a variety of manufacturers, for example, Intel or Advanced Micro Devices. In this example, the computing device 1510 also includes a system memory 1582, and a system bus 1584 that couples various system components including the system memory 1582 to the processing device 1580. The system bus 1584 is one of any number of types of bus structures including a memory bus, or memory controller; a peripheral bus; and a local bus using any of a variety of bus architectures.

Examples of computing devices suitable for the computing device 1510 include a desktop computer, a laptop computer, a tablet computer, a mobile computing device (such as a smart phone, a tablet device, or other mobile devices), or other devices configured to process digital instructions.

The system memory 1582 includes read only memory 1586 and random access memory 1588. A basic input/output system 1590 containing the basic routines that act to transfer information within computing device 1510, such as during start up, is typically stored in the read only memory 1586.

The computing device 1510 also includes a secondary storage device 1592 in some embodiments, such as a hard disk drive, for storing digital data. The secondary storage device 1592 is connected to the system bus 1584 by a secondary storage interface 1594. The secondary storage devices 1592 and their associated computer readable media provide nonvolatile storage of computer readable instructions (including application programs and program modules), data structures, and other data for the computing device 1510.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1592 or memory 1582, including an operating system 1596, one or more application programs 1598, other program modules 1500 (such as the software engines described herein), and program data 1502. The computing device 1510 can utilize any suitable operating system, such as Microsoft Windows™, Google Chrome™, Apple OS, and any other operating system suitable for a computing device. Other examples can include Microsoft, Google, or Apple operating systems, or any other suitable operating system used in tablet computing devices.

In some embodiments, a user provides inputs to the computing device 1510 through one or more input devices 1504. Examples of input devices 1504 include a keyboard 1506, mouse 1508, microphone 1510, and touch sensor 1512 (such as a touchpad or touch sensitive display). Other embodiments include other input devices 1504. The input devices are often connected to the processing device 1580 through an input/output interface 1514 that is coupled to the system bus 1584. These input devices 1504 can be connected by any number of input/output interfaces, such as a parallel port, serial port, game port, or a universal serial bus. Wireless communication between input devices and the interface 1514 is possible as well, and includes infrared, BLUETOOTH® wireless technology, 802.11a/b/g/n, cellular, or other radio frequency communication systems in some possible embodiments.

In this example embodiment, a display device 1516, such as a monitor, liquid crystal display device, projector, or touch sensitive display device, is also connected to the system bus 1584 via an interface, such as a video adapter 1518. In addition to the display device 1516, the computing device 1510 can include various other peripheral devices (not shown), such as speakers or a printer.

When used in a local area networking environment or a wide area networking environment (such as the Internet), the computing device 1510 is typically connected to a network through a network interface 1520, such as an Ethernet interface. Other possible embodiments use other communication devices. For example, some embodiments of the computing device 1510 include a modem for communicating across the network.

The computing device 1510 typically includes at least some form of computer readable media. Computer readable media includes any available media that can be accessed by the computing device 1510. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1510.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 27 is also an example of programmable electronics, which may include one or more such computing devices, and when multiple computing devices are included, such computing devices can be coupled together with a suitable data communication network so as to collectively perform the various functions, methods, or operations disclosed herein.

Additionally, if players are required to enter their scores when they leave the green after completing a hole, that entry will be time stamped. The hosting computer can then analyze the time intervals of players in order to identify players' pace of play and whether officials and offending players should be notified of slow play.

Embodiments of the present disclosure advantageously allow for the integration and management of various traditional documents required to be referenced and maintained by a player during a competitive round, particularly at the professional level of golf. Further, embodiments herein allow for the combination of documents and integration of information from various documents that would otherwise be impossible according to traditional methods of tracking such information. Further, archival of scores and player notes is significantly improved. Such information is also instantaneously shared with tournament officials and other individuals to improve accuracy and to aid in identifying any potential issues related to a player's round prior to completion.

With respect to scoring, a player's scorecard is automatically audited by comparing the player's scorecard during a round to scores kept by a marker of the player. Current methods of scorekeeping in professional tournaments for gallery and broadcast notification rely on a marker or other third party to assume a score of the player without knowing additional information such as whether any penalties were taken by the player. Further, the time to obtain official scoring results after a round of golf is significantly reduced.

Still other embodiments will become readily apparent to those skilled in this art from reading the above-recited detailed description in view of all the drawings and figures.

For example, the present general inventive concept can be embodied as a computer program product generally comprising computer-readable code on a computer-readable medium providable to a portable device. The computer-readable medium can include a computer-readable storage medium and a computer-readable transmission medium. The computer-readable storage medium is any data storage device or unit that can store data as a program which can be thereafter read by a computer system. Examples of the computer-readable storage medium include a hard-drive, read-only memory (ROM), random-access memory (RAM), CD-ROMs, DVDs, magnetic tapes, floppy disks, flash memory, and optical data storage devices. The computer-readable recording medium can also be distributed over network coupled computer systems so that the computer-readable program code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. An electronic system for recording and auditing golf scores, the system comprising:
   a first portable player handheld device and a second portable player handheld device each including a user interface and a control system in operable communication with the user interface, the control system including computer operable instructions and a processor, wherein the processor of the first portable player handheld device is configured to receive a name of a first user inputting data into the first portable player handheld device and a name of a second user inputting data into the second portable player handheld device, wherein the computer operable instructions are configured to cause the processor to:
   require a confirmatory input or action be received through the user interface of the first portable player handheld device that the name of the first user and the name of the second user are correct;
   allow the first user to input through the user interface of the first portable player handheld device marker score data regarding a score of the second user,
   allow the second user to input through the user interface of the second portable player handheld device user score data regarding the score of the second user,
   if the name of the first user has been received by the processor, the name of the second user has been received by the processor, and the confirmatory input or action has been received by the processor, compare the marker score data to the user score data, and
   generate an output warning signal in response to a conflict between the marker score data and the user score data.

2. The system of claim 1, wherein the computer operable instructions are configured to further cause the processor to:
   display on the user interface of the second portable player handheld device a warning in response to the output warning signal.

3. The system of claim 2, wherein the computer operable instructions are configured to further cause the processor to:

generate an output resolved signal in response to the marker score data and the user score data being the same, and remove from the display on the user interface of the second portable player handheld device a warning in response to the output resolved signal.

4. The system of claim 1, wherein the computer operable instructions are configured to further cause the processor to:

display on the user interface of the second portable player handheld device a marker score corresponding to the marker score data and a user score corresponding to the user score data in response to the output warning signal.

5. The system of claim 1, wherein the computer operable instructions are configured to further cause the processor to:

display on the user interface of the first portable player handheld device a warning in response to the output warning signal.

6. The system of claim 5, wherein the computer operable instructions are configured to further cause the processor to:

generate an output resolved signal in response to the marker score data and the user score data being the same, and remove from the display on the user interface of the first portable player handheld device the warning in response to the output resolved signal.

7. The system of claim 1, wherein the computer operable instructions are configured to further cause the processor to:

display on the user interface of the second portable player handheld device a marker score corresponding to the marker score data and a user score corresponding to the user score data in response to the output warning signal.

8. The system of claim 1, wherein the computer operable instructions are configured to further cause the processor to:

display on a user interface of a rules official device the marker score data and the user score data.

9. The system of claim 1, wherein the computer operable instructions are configured to further cause the processor to:

display on a user interface of a tournament official device the marker score data and the user score data.

10. The system of claim 1, wherein the computer operable instructions are configured to further cause the processor to:

display on the user interface of the second portable player handheld device a user accessible warning button in response to the output warning signal, and display on the user interface of the second portable player handheld device the marker score data and the user score data that conflict with each other in response to the user accessible warning button being accessed.

11. The system of claim 10, wherein the computer operable instructions are configured to further cause the processor to:

allow the user score data to be edited from the user interface of the second portable player handheld device.

12. The system of claim 11, wherein the computer operable instructions are configured to further cause the processor to:

display on the user interface of the second portable player handheld device a user accessible scorecard button, and display on the user interface of the second portable player handheld device a scorecard page, wherein the user score data is allowed to be edited from the scorecard page.

13. The system of claim 10, wherein the computer operable instructions are configured to further cause the processor to:

allow the marker score data to be edited from the user interface of the first portable player handheld device.

14. The system of claim 13, wherein the computer operable instructions are configured to further cause the processor to:

display on the user interface of the first portable player handheld device a user accessible scorecard button, and display on the user interface of the first portable player handheld device a score page, wherein the marker score data is allowed to be edited from the scorecard page.

15. The system of claim 1, wherein the user interface receives input from users through a touch interface on a display of the portable player handheld device.

16. The system of claim 1, wherein the marker score data and the user score data each include scores for individual holes of a round of golf.

17. The system of claim 1, wherein the user interface of the first portable player handheld device is configured to receive a signature of the second user and a signature of a scorekeeper upon conclusion of a round of golf.

18. The system of claim 1, wherein the user interface of the first portable player handheld device is configured to receive a signature of the first user and a signature of the second user upon conclusion of a round of golf.

19. The system of claim 1, wherein the computer operable instructions are configured to further cause the processor to:

cause a printing signal to be sent to a printer for printing the user score data.

20. The system of claim 19, wherein the printed user score data includes one or more indicators of any unresolved conflicts between the marker score data and the user score data.

* * * * *